US012762590B2

(12) United States Patent
Okuno

(10) Patent No.: US 12,762,590 B2
(45) Date of Patent: Oct. 13, 2026

(54) SERVER TRANSMITTING DELIVERY INFORMATION TO PRINTER AND GRANTING REWARD FOR PRINTING BASED ON DELIVERY INFORMATION

(71) Applicant: BROTHER KOGYO KABUSHIKI KAISHA, Nagoya (JP)

(72) Inventor: Tetsuya Okuno, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 185 days.

(21) Appl. No.: 18/782,770

(22) Filed: Jul. 24, 2024

(65) Prior Publication Data

US 2025/0037173 A1 Jan. 30, 2025

(30) Foreign Application Priority Data

Jul. 27, 2023 (JP) ................................. 2023-122334
Jul. 16, 2024 (JP) ................................. 2024-113259

(51) Int. Cl.

| | |
|---|---|
| ***G06F 3/12*** | (2006.01) |
| ***G06Q 30/0226*** | (2023.01) |
| ***G06Q 30/0241*** | (2023.01) |
| ***G06T 7/00*** | (2017.01) |
| ***H04N 1/32*** | (2006.01) |

(52) U.S. Cl.
CPC ....... *G06Q 30/0276* (2013.01); *G06F 3/1208* (2013.01); *G06F 3/1273* (2013.01); *G06F 3/1288* (2013.01); *G06Q 30/0226* (2013.01); *G06T 7/0002* (2013.01); *H04N 1/32133* (2013.01); *G06T 2207/10008* (2013.01); *G06T 2207/30144* (2013.01); *H04N 2201/3269* (2013.01)

(58) Field of Classification Search
None
See application file for complete search history.

(56) References Cited

U.S. PATENT DOCUMENTS 11,467,783 B2 * 10/2022 Fujisawa ............... G06F 3/1208
2021/0117136 A1 * 4/2021 Fujisawa ............... G06F 3/1285

FOREIGN PATENT DOCUMENTS

JP 2003-196540 A 7/2003

* cited by examiner

*Primary Examiner* — Dov Popovici
(74) *Attorney, Agent, or Firm* — Scully, Scott, Murphy & Presser, P.C.

(57) ABSTRACT

A server includes: a communication interface; a memory; and a controller. The memory is configured to store identification information identifying one of a printer and a user of the printer. The controller is configured to perform: a delivery process; an information acquisition process; and a granting process. The delivery process transmits delivery information to the printer via the communication interface. The printer is configured to perform printing based on the delivery information transmitted in the delivery process to output printed matter. The information acquisition process acquires quality information related to a printing quality of the printed matter. The granting process grants a reward to the one of the printer and the user of the printer identified by the identification information in accordance with the quality information acquired in the information acquisition process.

10 Claims, 14 Drawing Sheets

FIG. 5

| MODEL NUMBER OF PRINTER | INK COST FOR A4-SIZE [YEN] | BASE POINT [PT] (COMPENSATION FOR INK COST + REWARD FOR PRINTING) |
|---|---|---|
| P-AAA | 10 | 100 |
| P-BBB | 5 | 50 |
| P-CCC | 3 | 30 |

FIG. 7

| | UNIT NUMBER OF COMPENSATION POINTS [PT/PL] (COMPENSATION FOR INK COST + REWARD FOR PRINTING) | |
|---|---|---|
| MODEL NUMBER OF PRINTER | K | Y, M, C |
| P-AAA | 1.0 | 2.0 |
| P-BBB | 0.5 | 1.0 |
| P-CCC | 0.3 | 0.6 |

FIG. 8

| MODEL NUMBER OF PRINTER | UNIT NUMBER OF BASE POINTS [PT] |
|---|---|
| P-AAA | 10 |
| P-BBB | 5 |
| P-CCC | 3 |

FIG. 9A

| | | C | M | Y | K |
|---|---|---|---|---|---|
| UNIT NUMBER OF COMPENSATION POINTS [PT/PL] | | 2.0 | 2.0 | 2.0 | 1.0 |
| CONSUMPTION AMOUNT OF INK FOR AD PRINTING [PL] | | 10 | 12 | 14 | 16 |
| NUMBER OF COMPENSATION POINTS FOR EACH COLOR [PT] | GENUINE (MULTIPLIER = 100 %) | 20 | 24 | 28 | 16 |
| | NON-GENUINE (MULTIPLIER = 50 %) | 10 | 12 | 14 | 8 |

TOTAL NUMBER OF COMPENSATION POINTS FOR ALL COLORS
88.0 PT WHEN ALL COLORS ARE GENUINE
44.0 PT WHEN ALL COLORS ARE NON-GENUINE
78.0 PT = 10 + 24 + 28 + 16 WHEN ONLY CYAN IS NON-GENUINE

FIG. 9B

| | |
|---|---|
| UNIT NUMBER OF BASE POINTS [PT] | 10.0 |
| MULTIPLIER FOR GENUINE | 100% |
| MULTIPLIER FOR NON-GENUINE | 50% |

BASE POINTS
10.0 PT WHEN ALL COLORS ARE GENUINE
5.0 PT WHEN ANY COLOR IS NON-GENUINE

FIG. 9C

EX. 1 TOTAL NUMBER OF POINTS TO BE ISSUED (WHEN ALL COLORS ARE GENUINE) 98.0 PT = 88.0 + 10.0

EX. 2 TOTAL NUMBER OF POINTS TO BE ISSUED (WHEN ALL COLORS ARE NON-GENUINE) 49.0 PT = 44.0 + 5.0

EX. 3 TOTAL NUMBER OF POINTS TO BE ISSUED (WHEN ONLY CYAN IS NON-GENUINE) 83.0 PT = 78.0 + 5.0

SERVER TRANSMITTING DELIVERY INFORMATION TO PRINTER AND GRANTING REWARD FOR PRINTING BASED ON DELIVERY INFORMATION

REFERENCE TO RELATED APPLICATIONS

This application claims priorities from Japanese Patent Application No. 2023-122334 filed on Jul. 27, 2023 and Japanese Patent Application No. 2024-113259 filed on Jul. 16, 2024. The entire contents of these priority applications are incorporated herein by reference.

BACKGROUND ART

According to a conventional technology, an advertisement provision server receives an acquisition request for advertisement information from a host device possessed by the user of an image recording device and transmits the requested advertisement information to the host device. Once the advertisement provision server has received a notice from the host device that advertisement printing was completed, the server grants points appropriate for the advertisement printing to the user. The user can then use these points to take advantage of a refund service provided by the advertisement requester.

SUMMARY

The conventional system described above discloses a technique for issuing a number of points to users who print advertisements. However, this disclosure gives no special consideration regarding what actions to take in cases where the image quality of the actual printed advertisement is poor, causing the effect of the advertisement to be insufficient.

In view of the foregoing, it is an object of the present disclosure to provide a server capable of maintaining the printing quality of delivery information to ensure the effectiveness of this delivery information.

In order to attain the above and other objects, the present disclosure provides a server. The server includes: a communication interface; a memory; and a controller. The memory is configured to store identification information identifying one of a printer and a user of the printer. The controller is configured to perform: a delivery process; an information acquisition process; and a granting process. The delivery process transmits delivery information to the printer via the communication interface. The printer is configured to perform printing based on the delivery information transmitted in the delivery process to output printed matter. The information acquisition process acquires quality information related to a printing quality of the printed matter. The granting process grants a reward to the one of the printer and the user of the printer identified by the identification information in accordance with the quality information acquired in the information acquisition process.

As a result, the present disclosure can provide users with an incentive to improve printing quality by rewarding the users or printers that execute printing based on delivery information at a prescribed quality.

BRIEF DESCRIPTION OF DRAWINGS

FIG. 5 is an explanatory diagram illustrating an example of associations established between model numbers for printers and base points.

FIG. 7 is an explanatory diagram illustrating an example of associations established between the model numbers for printers and unit numbers of compensation points.

FIG. 8 is an explanatory diagram illustrating an example of associations established between the model numbers for printers and unit numbers of base points.

FIG. 9A is an explanatory diagram illustrating an example of the calculation of the number of compensation points.

FIG. 9B is an explanatory diagram illustrating an example of the calculation of the number of base points.

FIG. 9C is an explanatory diagram illustrating an example of the calculation of the number of points to be issued.

DESCRIPTION

An embodiment of the present disclosure will be described while referring to the accompanying drawings. In this embodiment, the present disclosure is applied to an information delivery system that delivers advertisement information (advertisement images) from a server to printers for printing.

<Overall Configuration of the Information Delivery System>

Figure 1:
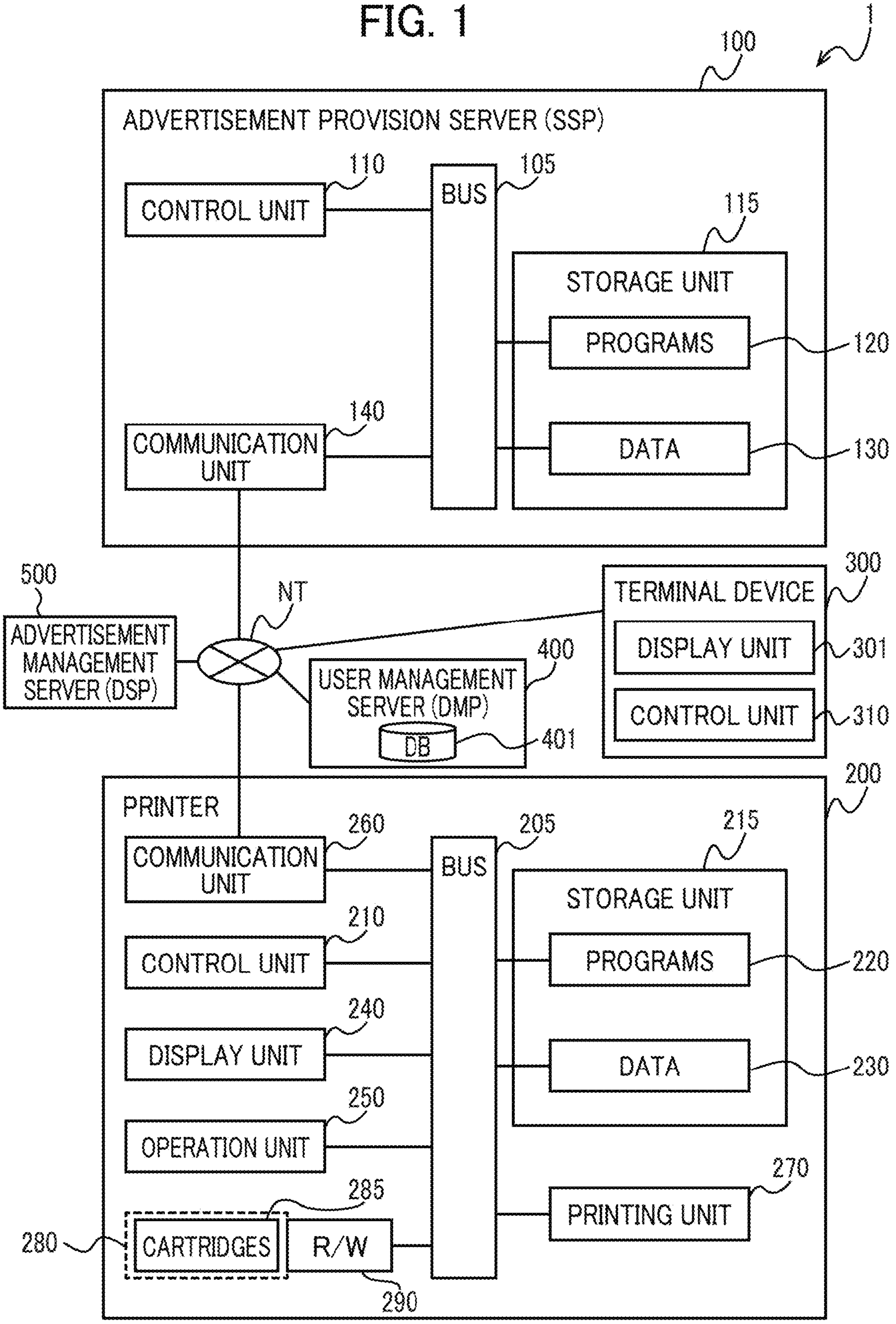
FIG. 1 is a block diagram illustrating an example of the overall configuration of an information delivery system including an advertisement provision server, an advertisement management server, a user management server, a terminal device, and a printer.

FIG. 1 illustrates an example of the overall configuration of an information delivery system 1 according to the present embodiment. As illustrated in FIG. 1, the information delivery system 1 includes an advertisement provision server (SSP: a supply-side platform) 100, a printer 200, a terminal device 300, a user management server (DMP: a data management platform) 400, and an advertisement management server (DSP: a demand-side platform) 500. The servers 100, 400, and 500, the printer 200, and the terminal device 300 each include a communication unit and can communicate with each other over a network NT. The network NT includes at least one of the Internet, a local area network (LAN), and a wide area network (WAN). The communication unit may be configured to include a plurality of types of communication circuits for connecting to the network NT. In this case, each device connected to the network NT may communicate with a plurality of other devices using different communication circuits. In the present embodiment, the different types of communication circuits are collectively referred to as the communication unit.

<Terminal Device>

The terminal device 300 is a smartphone or other portable device owned by the user, for example. In this example, the terminal device 300 is connected to the network NT via a wireless connection. In addition to a smartphone, the terminal device 300 may be any suitable terminal separate from the printer 200, such as a tablet computer, a laptop computer, or a desktop computer. Alternatively, the terminal device 300 may be a portable or stationary terminal provided in a karaoke box, any of various types of stores, and the like for selecting songs, selecting items from menus, or browsing products, for example. The terminal device 300 includes a display unit 301 and a control unit 310. While not illustrated in the drawings, the terminal device 300 also includes an operation unit, a storage unit, a communication unit, and the like. The storage unit stores various programs. A user ID is associated with the terminal device 300. The user ID is information identifying the user who owns or uses the terminal device 300. The control unit 310 executes the various programs stored in the storage unit. These programs include a program for implementing the process illustrated in the flowchart of FIG. 6 described later.

The display unit 301 is configured of a touchscreen that also serves as an operation unit by a touchpad integrally combined with a liquid crystal display, for example. The display unit 301 displays various information and receives various input operations from the user.

The user can input various instructions into the terminal device 300 by operating the touchscreen. The user can also receive external services from outside the system via the Internet through operations on the touchscreen. Examples of external services may be services that are available using prescribed terminals other than the printer and that provide user information held in association with an external user ID for targeted advertising. Specifically, external services are provided by entities different from the vendor of the printer, such as payment service providers of QR code (registered trademark) payments and credit card payments, ad network providers, advertisement platform providers, social media providers including E-commerce mall operators and SNS retailers, service providers providing services through various application programs (apps), service providers of transportation IC cards and the like, ridesharing service providers such as taxi apps and food delivery services, online travel agents (OTA) and other service providers that possess user identification information and user attribute/behavioral information and use this information for programmatic advertising (web advertising and social media advertising). "QR code" is a Japanese registered trademark of DENSO WAVE INCORPORATED. External services may also be services other than printer-based services. Each user is assigned an external user ID as identification information unique to the user when the user receives any of various external services. As will be described later, the external user ID is transmitted to the advertisement provision server 100 to be associated with a printer 200 designated by the user, e.g., the printer ID of the printer 200 used by this user. The advertisement provision server 100 stores these external user IDs and printer IDs as associated information.

<User Management Server>

The user management server 400 manages information on the user (user information) that is acquired and updated via the terminal device 300. Though not illustrated in the drawings, the user management server 400 includes a control unit, a storage unit, a communication unit, and the like. Examples of user information managed by the user management server 400 include the user's gender, age, place of residence, occupation, place of work, annual income, family structure, or behavioral information. Examples of behavioral information include the user's website browsing history, website search history, web advertisement display history, website click history, website purchase history, payment amount information, visited stores information, and GPS information when accessing the aforementioned external services using the terminal device 300. The user's behavioral information is associated with the external user ID of that user and can be identified by the external user ID. The behavioral information for all users who employs external services is stored in a behavioral information database 401 in the storage unit. In the behavioral information database 401, the behavioral information for each user is associated with the external user ID of the user.

In the present embodiment, behavioral information that has been associated with the external user ID of each user is further converted and compiled into a form of corresponding user interest information. The user interest information specifies items of interest to the user. The items of interest to users have been preset in association with the contents of the above behavioral information. Examples of the items of interest include "cars," "health," "travel," "food," "saving money," and the like. The user interest information may also include information specifying the location of the user (e.g., "Tokyo") inferred from the content of the behavioral information for the user. The user interest information associated with each external user ID in this way is transmitted to the advertisement provision server 100 via the communication unit.

<Advertisement Provision Server>

The advertisement provision server 100 is installed and managed by the manufacturer of the printer 200, for example. At prescribed timings, the advertisement provision server 100 acquires the user interest information corresponding to the external user ID that has been associated with the printer ID of the printer 200 that is the destination of delivery (delivery destination), and receives to acquire advertisement images tailored to this user interest information from the advertisement management server 500. The advertisement provision server 100 then delivers the acquired advertisement images to the printer 200 for printing. The advertisement provision server is an example of the server of the present disclosure, and the advertisement images are examples of the delivery information of the present disclosure.

More specifically, the advertisement provision server 100 includes a control unit 110, a storage unit 115, and a communication unit 140. The control unit 110 is an example of the controller of the present disclosure. The communication unit 140 is an example of the communication interface of the present disclosure. The storage unit 115 is an example of the memory of the present disclosure. The control unit 110, storage unit 115, communication unit 140, and the like are connected via a bus 105 and can exchange information with each other. The storage unit 115 is configured of RAM, ROM, EEPROM, a hard disk drive, and the like, for example. The storage unit 115 stores various programs 120, and various data 130. The programs 120 include an information delivery program for controlling the advertisement provision server 100 to implement a control process according to the sequence chart of FIG. 2 described later. The data 130 includes the user interest information described above, the printer ID of the printer 200, user account information, external user IDs, and advertisement images. This printer ID is associated with the external user IDs and user account information for all users that use the printer 200. Note that the printer 200 is used by at least one user.

The control unit 110 is a device, such as a CPU or other processor, that performs data processing. The control unit 110 executes the various programs stored in the storage unit 115. The control unit 110 implements various processes including data communications with the printer 200, terminal device 300, user management server 400, and advertisement management server 500 connected to the network NT. The communication unit 140 includes hardware, such as a network interface card (NIC) for connecting to Ethernet (registered trademark), that is connected to the network NT. "Ethernet" is a Japanese registered trademark of FUJIFILM Business Innovation Corp. The communication unit 140 facilitates communications between the advertisement provision server 100 and the printer 200, terminal device 300, user management server 400, and advertisement management server 500.

<Advertisement Management Server>

The advertisement management server 500 transmits advertisement images to be printed by the printer 200 to the advertisement provision server 100. While not illustrated in the drawings, the advertisement management server 500 includes a control unit, a storage unit, and a communication unit. In this example, the advertisement management server 500 receives a bid request from the advertisement provision server 100 via the communication unit. Note that the bid request is a request to acquire suitable advertisement images through a bidding process. The terminal devices or servers (not illustrated) of a plurality of advertisers are connected to the network NT. The control unit of the advertisement management server 500 holds an auction for delivery of advertisement images that are to be submitted along with bids from these advertisers in response to the above bid request and obtains an advertisement image suited to the user interest information through bids from the participating advertisers. The advertisement management server 500 may acquire the behavioral information directly from the user management server 400 or indirectly via the advertisement provision server 100, instead of the user interest information, and may acquire an advertisement image suited to this behavioral information from bids in the auction. When there is a winning bid that meets predetermined conditions of the auction, the control unit of the advertisement management server 500 acquires the corresponding advertisement image from the terminal device or the like of the advertiser who is the winning bidder. After acquiring this advertisement image, the advertisement management server 500 transmits this advertisement image to the advertisement provision server 100 via the communication unit, the advertisement provision server 100 transfers the advertisement image to the printer 200, and the printer 200 performs printing based on the advertisement image. Alternatively, the advertisement provision server 100 may be configured to acquire the above advertisement image from the advertisement management server 500, or the advertisement management server 500 may acquire the advertisement image from another external server and may transmit this image to the advertisement provision server 100.

The servers 100, 400, and 500 may each be configured as a standalone server or may be each be configured of a cluster of multiple servers. Alternatively, a single standalone server may be provided with the functions of two or more of the servers 100, 400, and 500.

<Printer>

The printer 200 is assigned the printer ID described above. The printer ID is an example of the identification information identifying the printer of the present disclosure. The printer 200 includes a control unit 210, a storage unit 215, a display unit 240, an operation unit 250, a communication unit 260, and a printing unit 270. The control unit 210, storage unit 215, display unit 240, operation unit 250, communication unit 260, and printing unit 270 are interconnected via a bus 205 and can exchange information with each other.

The storage unit 215 is configured of RAM, ROM, EEPROM, and a hard disk drive, for example. The storage unit 215 stores various programs 220, and various data 230. The programs 220 include a program for controlling the printer 200 to implement the control process according to the sequence chart of FIG. 2 described later, for example. The data 230 includes the printer ID described above, and advertisement images received from the advertisement provision server 100, that is, advertisement images that have been acquired from the terminal devices or the like of winning bidders from among advertisers participating in auctions and relayed by the advertisement provision server 100. In addition to the above information, the storage unit 215 may store other information on the printer 200 including performance information related to monochrome/color printing, specification information, intended use information such as whether the printer is intended for home use or office use, and destination information indicating the intended country of use. The storage unit 215 may also store the number of sheets printed by the printing unit 270 and the like. At least some of the various data described above may be stored in the storage unit 115 of the advertisement provision server 100. Alternatively, at least some of the data, which is original data, may be stored in one of the storage unit 215 of the printer 200 and the storage unit 115 of the advertisement provision server 100, and duplicate data of this original data may be stored in the other storage unit.

The control unit 210 is a device, such as a CPU or other processor, that performs data processing. The control unit 210 executes the various programs stored in the storage unit 215. The display unit 240 is a liquid crystal display, for example, that can display various information. The operation unit 250 is configured of a keyboard and buttons, for example, and receives input operations from the user. By operating the operation unit 250, the user can input various instructions into the printer 200. The communication unit 260 is connected to the network NT and facilitates communications between the printer 200 and the advertisement provision server 100, advertisement management server 500, user management server 400, and terminal device 300. The printing unit 270 includes a printing engine. The printing unit 270 performs printing by forming an image on a sheet of printing paper according to the inkjet method while feeding and conveying the sheet from a paper tray with a conveying mechanism (not illustrated), for example.

The printer 200 also includes a cartridge holder 280. The cartridge holder 280 can accommodate a plurality of cartridges 285. The cartridges 285 include cartridges for a plurality of ink colors, including cyan, magenta, yellow, and black, for example. The cartridge holder 280 includes ink level sensors (not illustrated) that can detect the residual amounts or consumption amounts of ink in the respective cartridges 285 according to a known method. The ink is an example of the consumable of the present disclosure. Note that the sheet of printing paper is also an example of the consumable of the present disclosure (described later).

The printing unit 270 performs printing processes while consuming ink from the cartridges 285. The cartridge holder 280 also includes reader-writers (R/W) 290. Each reader-writer 290 reads cartridge information from and writes cartridge information to an IC chip provided on the corresponding one of the cartridges 285 accommodated in the cartridge holder 280. The reader-writer 290 detects the type and the like of the corresponding cartridge 285 accommodated in the cartridge holder 280 by reading cartridge information from the corresponding IC chip, for example. The reader-writer 290 may also detect the consumption amount or the residual amount of ink in the corresponding cartridge 285 by reading the IC chip of the corresponding cartridge 285.

<Process Flow>

In the information delivery system 1 of the present embodiment, the advertisement provision server 100 first stores external user IDs in the storage unit 115 in association with the printer ID.

Specifically, when the advertisement provision server 100 receives a request from a browser running on the terminal device 300 for a web page of an advertisement delivery service, the advertisement provision server 100 transmits display information for that web page to the terminal device 300. The terminal device 300 uses this display information to display a web page screen on the display unit 301. The terminal device 300 inputs user account information including a user ID and password in accordance with operations the user performs in the web page screen. The inputted user account information is used for creating a user account for the advertisement delivery service, and is stored in the storage unit 115 of the advertisement provision server 100. Next, the terminal device 300 receives input specifying the printer ID of the printer 200, which is the destination of the advertisement delivery, and an external user ID, and transmits the received input information to the advertisement provision server 100. The advertisement provision server 100 stores the external user ID and printer ID received from the terminal device 300 in the storage unit 115 in association with the user account information of the user account.

At this time, the advertisement provision server 100 may receive advertisement delivery times from the terminal device 300 indicating the user's desired delivery schedule in response to user operations in the web page screen and may store these advertisement delivery times in the storage unit 115 in association with the external user ID.

Since external user IDs are associated with printer IDs in the information delivery system 1 described above, the advertisement provision server 100 can acquire user interest information corresponding to external user IDs associated with the printer ID of the printer 200 serving as the destination of the delivery, and can receive advertisement images tailored to this user interest information from the advertisement management server 500 and transmit the advertisement images to the printer 200. The printer 200 performs printing based on the received advertisement images. Next, the control sequence executed through cooperation among the advertisement provision server 100, advertisement management server 500, user management server 400, and printer 200 to implement this process flow will be described with reference to the sequence chart in FIG. 2.

Figure 2:
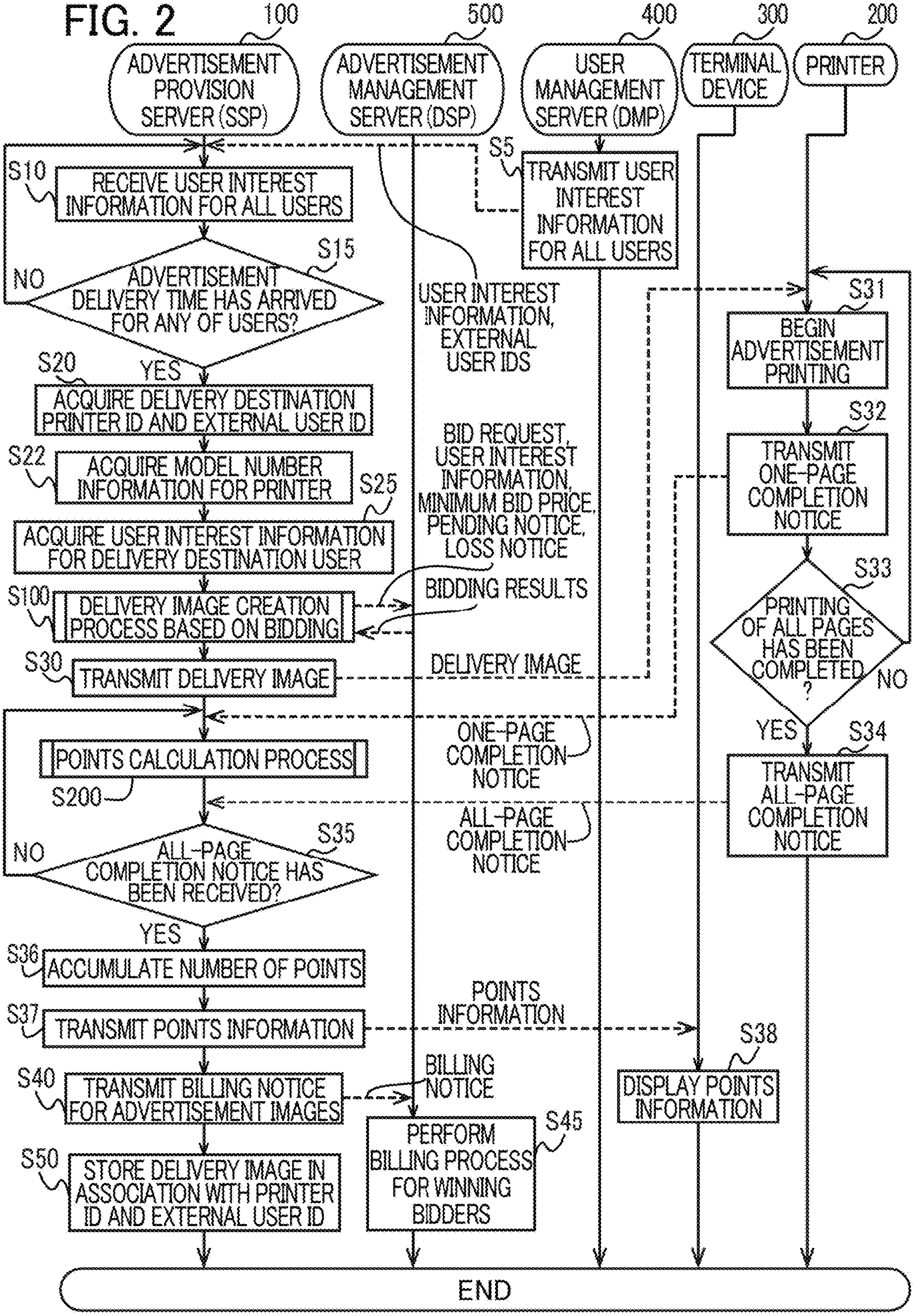
FIG. 2 is a sequence chart illustrating an example of steps in a process executed by the advertisement provision server, the advertisement management server, the user management server, the terminal device, and the printer in cooperation with each other.

When the advertisement provision server 100 requests user interest information related to an external user ID from the user management server 400, in S5 of FIG. 2 the user management server 400 transmits user interest information for all users generated based on their behavioral information to the advertisement provision server 100 together with the corresponding external user IDs, as described above. The process in S5 may be executed periodically at fixed intervals, for example, or may be executed at other suitable timings. The user interest information transmitted by the user management server 400 for all users is received by the advertisement provision server 100 in S10.

In S15 the advertisement provision server 100 determines whether an advertisement delivery time has arrived for any of the users for whom user interest information has been received in S10. In the present embodiment, advertisement delivery times, which are the times that advertisement images are printed and provided to a user, are determined for each user in advance. For example, the external user IDs for all users, the printer IDs for the corresponding printers 200, and the corresponding advertisement delivery times are associated with each other and stored in the storage unit 115 as correlations. Thus, in S15 the advertisement provision server 100 determines whether the current time corresponds to any of the advertisement delivery times for any user.

When the current time does not correspond to an advertisement delivery time for any user (S15: NO), the advertisement provision server 100 returns to S10 and repeats the same process by again receiving user interest information for all users transmitted in S5. When the advertisement provision server 100 determines that the current time coincides with an advertisement delivery time for any user (S15: YES), the process advances to S20.

In S20 the advertisement provision server 100 identifies and acquires the external user ID in accordance with the determination results in S15, and the corresponding printer ID. In S22 the advertisement provision server 100 acquires model number information for the printer 200 corresponding to the printer ID acquired in S20. The model number information for the printer 200 may be stored in the storage unit 115 in association with the printer ID of the printer 200, or the advertisement provision server 100 may acquire the model number information for the printer 200 by accessing a server belonging to the manufacturer of the printer 200 via the network NT.

In S25 the advertisement provision server 100 identifies and acquires user interest information for the user corresponding to the external user ID acquired in S20 from the user interest information for all users received in S10.

In S100 the advertisement provision server 100, in cooperation with the advertisement management server 500, performs a delivery image creation process for creating a delivery image to be printed by the printer 200 based on advertisement images submitted along with bids from advertisers.

<Delivery Image Creation Process>

The control process executed by the control unit 110 of the advertisement provision server 100 in the delivery image creation process of S100 will be described in detail with reference to the flowchart illustrated in FIG. 3.

Figure 3:
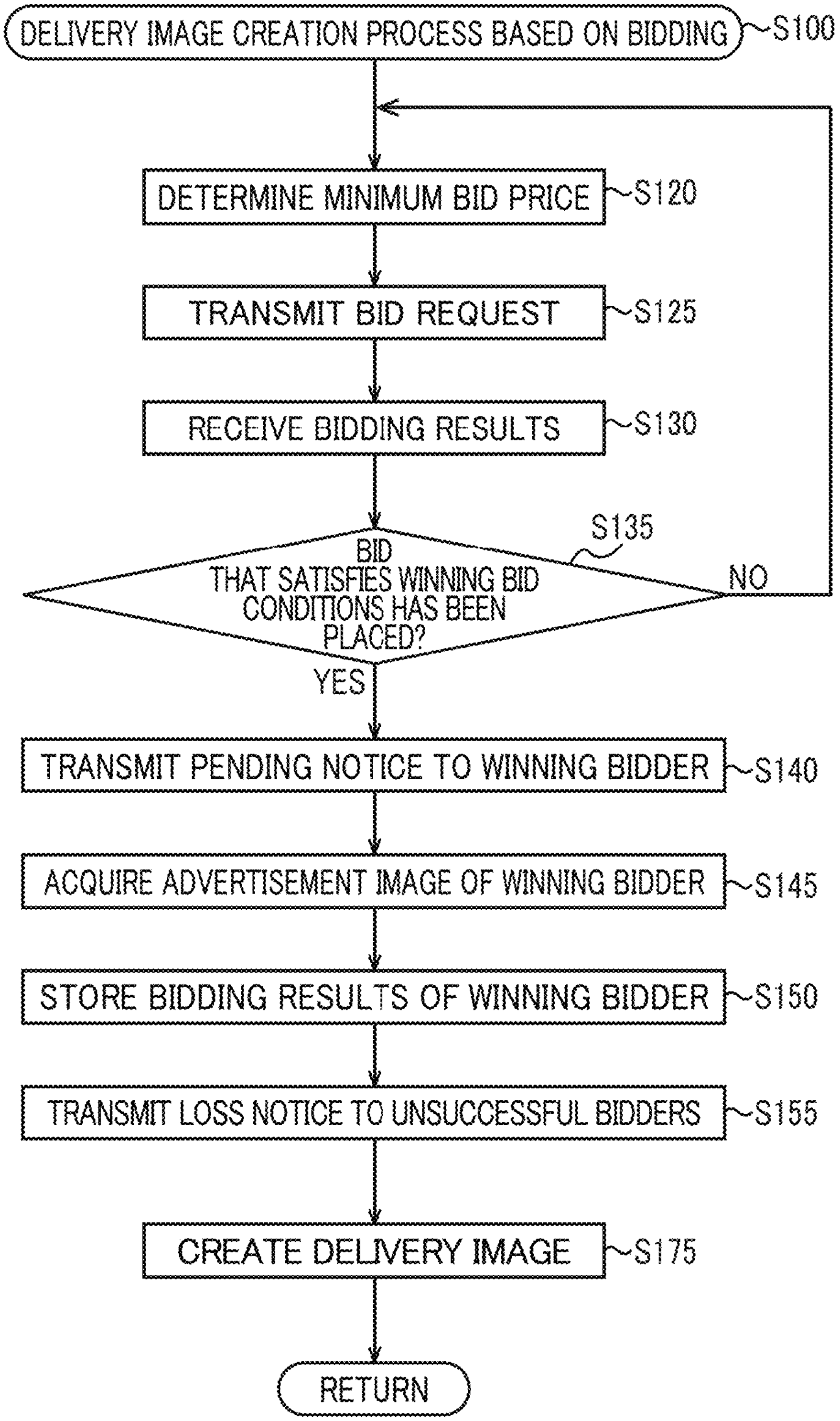
FIG. 3 is a flowchart illustrating an example of steps in a delivery image creation process executed by a control unit of the advertisement provision server.

In S120 of FIG. 3, the control unit 110 first determines a minimum bid price for soliciting bids for delivery of an advertisement image. Minimum bid prices are uniquely determined in advance and stored in the storage unit 115, for example. In S120 the control unit 110 determines a corresponding minimum bid price based on the stored content in the storage unit 115.

In S125 the control unit 110 transmits a bid request to the advertisement management server 500. At this time, the minimum bid price determined in S120 and the user interest information acquired in S25 of FIG. 2 are transmitted to the advertisement management server 500 together with the bid request. In response to this bid request, the advertisement management server 500 holds an auction to solicit bids for an advertisement tailored to the user interest information received from the advertisement provision server 100. In the bid solicitation, the advertisement management server 500 requests an advertisement image that satisfies predetermined conditions, including a condition that the advertisement is suited to the user interest information and a condition that the bid price is the minimum bid price or higher. Since the user interest information is generated based on behavioral information, as described above, an advertisement that is suited to the user interest information is equivalent to an advertisement that is suited to the behavioral information. Note that the control unit 110 may, through a bidding process, acquire an advertisement image suited to behavioral information rather than user interest information.

In S130 the control unit 110 receives bidding results from the advertisement management server 500 for the auction held in response to the bid request sent in S125. When a bid that satisfies the predetermined conditions stipulated in the bid request has been placed, the content of the received bidding results includes the advertisement image of the winning bidder. When no bids that satisfy the predetermined conditions stipulated in the bid request have been placed, such information is included in the content of the bidding results.

In S135 the control unit 110 determines based on the content received in S130 whether a bid that satisfies winning bid conditions has been placed. The winning bid conditions include a condition that the bid price is the highest, for example. The winning bid conditions may include other conditions that the predetermined conditions stipulated in the bid request are satisfied. When there is no bid that satisfies the winning bid conditions (S135: NO), the control unit 110 returns to the process in S120 described above and repeats the same process. When the process in S120 is executed after a NO determination in S135, the control unit 110 sets the minimum bid price lower than the previous minimum bid price, for example. On the other hand, when there is a bid that satisfies the winning bid conditions (S135: YES), the control unit 110 advances to S140.

In S140 the advertisement provision server 100 sends a "pending notice" to the advertisement management server 500 in order to notify the winning bidder, i.e., the advertiser who has submitted the bid satisfying the winning bid conditions that the content of the bid will be adopted and stored for use without deletion. Upon receiving this pending notice, the advertisement management server 500 transfers the pending notice to the terminal device or the like of the winning bidder.

In S145 the control unit 110 identifies and acquires the advertisement image of the winning bidder. The advertisement image of the winning bidder is included in the bidding results received from the advertisement management server 500 in S130. In S150 the control unit 110 stores the bidding results by the winning bidder, i.e., the advertisement image and the like acquired in S145, in the storage unit 115.

In S155 the control unit 110 transmits a "loss notice" to the advertisement management server 500 to notify unsuccessful bidders, i.e., advertisers who have submitted bids not meeting the winning bid conditions, that their bidding content will not be adopted because another bidder has had the winning bid. Upon receiving this loss notice, the advertisement management server 500 transfers the notice to the terminal devices or the like of the unsuccessful bidders. Subsequently, the process advances to S175.

In S175 the control unit 110 creates a delivery image. In the delivery image the control unit 110 arranges the advertisement image of the winning bidder, and specifically information including the advertisement image in the bidding results received from the advertisement management server 500 in S130. Subsequently, the control unit 110 ends the process of FIG. 3.

While the advertisement provision server 100 creates the delivery image in S175, the advertisement management server 500 instead may create the delivery image, and the advertisement provision server 100 may acquire this delivery image from the advertisement management server 500. Furthermore, rather than creating a delivery image in S175, the control unit 110 may create print data for printing a delivery image in any of various page description languages. Furthermore, the delivery image may include a plurality of advertisement images. In this case, in S145 the control unit 110 may acquire the advertisement images from a plurality of advertisers or may acquire the advertisement images from one advertiser. Furthermore, the control unit 110 may create a delivery image including a plurality of advertisement images or may create a plurality of delivery images each of which includes one or more advertisement images.

<Processes Following the Delivery Image Creation Process>

Returning to FIG. 2, after the advertisement provision server 100 completes the process of S100 described above, the process advances to S30. In S30 the advertisement provision server 100 transmits the delivery image created in S175 of the delivery image creation process of S100 to the printer 200 together with a print instruction to print the delivery image. The process executed in S30 is an example of the delivery process of the present disclosure. The advertisement provision server 100 may also deliver the delivery image to the printer 200 through a relay device in S30. Alternatively, instead of delivering the delivery image to the printer 200, the advertisement provision server 100 may transmit a page description language description required for printing the delivery image or a link to the delivery image to the printer 200. When the printer 200 receives a link to a delivery image, the printer 200 accesses that link to acquire the delivery image.

The printer 200 receives the print instruction transmitted from the advertisement provision server 100 in S30 and in S31 begins advertisement printing corresponding to the delivery image received together with the print instruction. Once the printing of one page is completed, in S32 the printer 200 transmits a one-page completion notice to the advertisement provision server 100, and the advertisement provision server 100 receives the one-page completion notice.

<Granting Points>

In the present embodiment, users are granted (awarded) points for advertisement printing described above. The users can use these points to enjoy desired services. The points are an example of the reward of the present disclosure. In this example, the number of points is calculated each time one page of advertisement printing is completed on the printer 200 using the method described below. Upon receiving a one-page completion notice transmitted in S32 described above, the advertisement provision server 100 performs a points calculation process in S200. The control process executed by the control unit 110 of the advertisement provision server 100 in the points calculation process of S200 will be described in detail with reference to the flowchart illustrated in FIG. 4.

Figure 4:
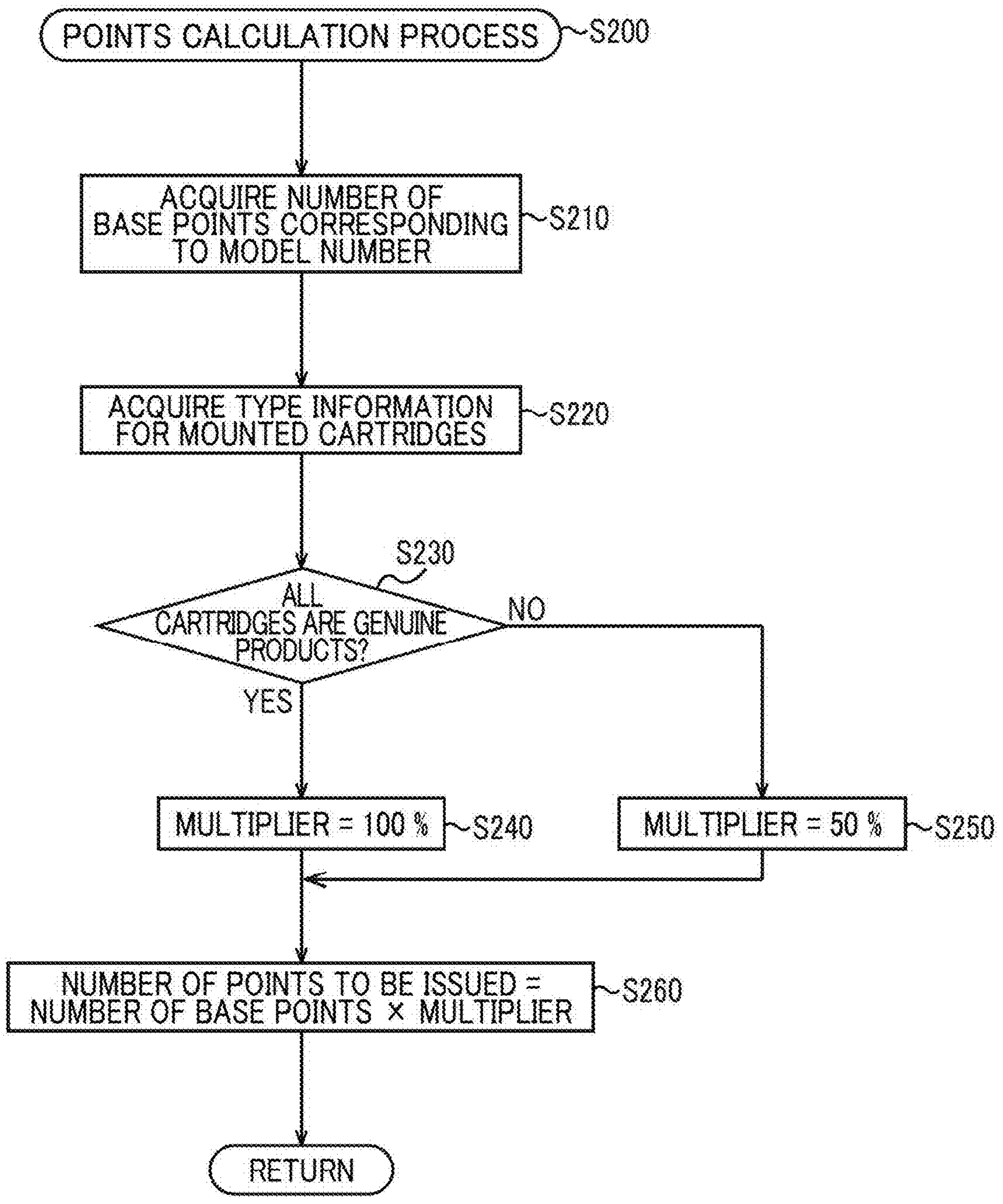
FIG. 4 is a flowchart illustrating an example of steps in a points calculation process executed by the control unit of the advertisement provision server.

In S210 at the beginning of FIG. 4, the control unit 110 acquires the number of base points associated with the model number of the printer 200, which is indicated by the model number information acquired in S22 of FIG. 2 described above. Base points include points compensating for the cost of ink consumed by the printer 200 when performing advertisement printing, and points given as a reward for advertisement printing. The number of base points is determined on the basis of the cost of ink for printing one page of an A4-size sheet of printing paper in color at standard print settings on the printer 200, for example. In the example illustrated in FIG. 5, a printer 200 with model number "P-AAA" has an ink cost of 10 yen for printing one page of A4-size printing paper, and the number of base points associated with this cost is set to 100 points. Since one point is equivalent to one yen in this example, the user is granted base points that convert to 10 times the cost of ink for printing one A4-size sheet. Similarly, a printer 200 with model number "P-BBB" has an ink cost of 5 yen for printing one page of A4-size printing paper, and the number of base points associated with this cost is set to 50 points. A printer 200 with model number "P-CCC" has an ink cost of 3 yen for printing one page of A4-size printing paper, and the number of base points corresponding to this cost is set to 30 points.

Returning to FIG. 4, in S220 the control unit 110 acquires type information on the cartridges 285 mounted in the cartridge holder 280 of the printer 200 based on detection results by the reader-writers 290. The type information described herein is primarily information indicating whether the cartridges 285 are genuine products provided by the manufacturer for use in the printer 200 or non-genuine products. When a plurality of cartridges 285 for a plurality of ink colors is mounted in the cartridge holder 280, as described above, the control unit 110 acquires a plurality of sets of type information for all cartridges 285. The type information is an example of the quality information of the present disclosure, and the process executed by the control unit 110 of the advertisement provision server 100 in S220 is an example of the information acquisition process of the present disclosure.

In S230 the control unit 110 determines whether all cartridges 285 mounted in the cartridge holder 280 are genuine products on the basis of the type information acquired in S220. Ink accommodated in a genuine cartridge 285 is an example of the specific-type consumable of the present disclosure. When all cartridges 285 are genuine products (S230: YES), in S240 the control unit 110 sets a multiplier by which the number of base points is to be multiplied when calculating the number of points to 100%. On the other hand, when even one of the cartridges 285 is a non-genuine product (S230: NO), in S250 the control unit 110 sets the multiplier by which the number of base points is to be multiplied to 50%. One of these multipliers is associated with each type of cartridge 285, and the associations are stored in the storage unit 115 of the advertisement provision server 100 in advance. The multipliers are an example of a granting rate of the present disclosure.

When the manufacturer of the genuine cartridges 285 has prepared a plurality of types of cartridges 285 having mutually different ink qualities, the control unit 110 may acquire ink quality information as the type information and may set the multiplier according to the ink quality. In the above description, the printer 200 is an inkjet printer, and ink in cartridges 285 used in the printer 200 are an example of the consumable, but the present disclosure is not limited to this type of consumable. For example, when the printer 200 is a laser printer, the toner in toner cartridges used in the printer 200 may serve as the consumable. Alternatively, the printing paper described above can be applied as the consumable. In this case, the control unit 110 may acquire paper quality information as the type information through user input on a control panel or the like provided on the operation unit 250 of the printer 200. The same applies to each of the variations described later.

After setting the multiplier in S240 or S250, in S260 the control unit 110 calculates the number of points to be issued for one page by multiplying the number of base points by the multiplier set in S240 or S250, and subsequently ends the process in FIG. 4.

In S33 of FIG. 2, the printer 200 determines whether all pages have been printed. While the advertisement printing of all pages started in S31 has not been completed (S33: NO), the printer 200 continues to transmit a one-page completion notice in S32 for each page printed to the advertisement provision server 100. Once the printer 200 has completed the advertisement printing of all pages (S33: YES), in S34 the printer 200 transmits an all-page completion notice to the advertisement provision server 100. In the meantime, the advertisement provision server 100 determines in S35 whether an all-page completion notice has been received and continues to calculate the number of points to be issued corresponding to each printed page in S200 while an all-page completion notification has not been received (S35: NO). Once an all-page completion notice has been received (S35: YES), the advertisement provision server 100 advances to the process in S36 described below. In this way, the advertisement provision server 100 accumulates the number of points to be issued for the number of pages of advertisements printed by the printer 200 (see S36 described below). Hence, the process performed by the advertisement provision server 100 in S34 is an example of the amount acquisition process of the present disclosure.

In S36 the number of points calculated for each page is totaled as described above. In other words, the number of points for each page calculated in S200 is accumulated for the number of pages of advertisements printed on the printer 200 to determine the total number of points that will be granted to the user.

In S37 the advertisement provision server 100 transmits points information to the terminal device 300 corresponding to the user account information of the user account which has been previously associated with the printer ID of the printer 200. The points information in information indicating the number of points determined in S36, for example. The advertisement provision server 100 also associates the number of points with the user account information stored in the storage unit 115, thereby granting these points to the corresponding user. Note that the points may be granted to the printer 200 by associating the points with the printer ID of the printer 200 corresponding to the user rather than the user themselves. The process executed by the control unit 110 of the advertisement provision server 100 in S200, S36, and S37 described above is an example of the granting process of the present disclosure. In S38 the terminal device 300 displays the points information received in S37 on the display unit 301.

In S40 the advertisement provision server 100 transmits a billing notice to the advertisement management server 500 in order that the advertisement management server 500 can bill the advertisers, i.e., the winning bidders that have provided each of the advertisement images included in the delivery image sent in S30, for the cost of performing their advertisement printing. Upon receiving the billing notice from the advertisement provision server 100, in S45 the advertisement management server 500 performs a billing process to send billing notices to the terminal devices or the like of the winning bidders.

In S50 the advertisement provision server 100 stores the delivery image sent in S30 in the storage unit 115 in association with the printer ID of the corresponding printer 200, the external user ID or the aforementioned user account information for the user account of the corresponding user, the current time information, and the winning bid conditions met by the winning bidders of the advertisement images included in this delivery image. Subsequently, the process according to the sequence chart in FIG. 2 ends.

<Effects of the Embodiment>

In the embodiment described above, the control unit 110 delivers delivery information to the printer 200 in S30 to be printed on the printer 200. In S220 of the points calculation process of S200, the control unit 110 acquires quality information related to the print quality of the printed delivery information. In the above example, the quality information is type information on the cartridges 285, and the delivery information is an advertisement image or a delivery image including one or more advertisement images. Through S200, S36, and S37, the control unit 110 grants points corresponding to the acquired quality information to the user corresponding to the user ID or the printer 200 corresponding to the printer ID.

Thus, in the present embodiment points are granted to the user or the printer 200 when printing based on the delivery information is performed using cartridges 285 of a type that is expected to produce a certain quality. In the above example, the type of cartridges 285 expected to produce a certain quality is a genuine product. This method can provide the user with an incentive to improve the printing quality of the printer 200. Thus, the method of the present embodiment can maintain the print quality of the delivery information to ensure the effectiveness of the delivery information.

In addition, when the ink is a genuine product produced by the manufacturer of the printer 200, for example, the printing quality of the printer 200 is generally higher with less chance of defects or the like in printed results than when using compatible, non-genuine products. Furthermore, when more than one type of genuine product is available, some genuine products may have a higher quality than others. Therefore, one feature of the embodiment is that points are granted in accordance with the type of ink accommodated in the printer 200, as described above in S230, S240, and S250 of FIG. 4. In other words, more points are granted when ink is of a type expected to be of high quality than when ink is of another type. Thus, the method of the present embodiment can provide users with an incentive to improve printing quality.

A particular feature of the present embodiment is that the advertisement provision server 100 sets a multiplier according to the type of ink in S260 of FIG. 4 and determines the number of points to be granted in S36 of FIG. 2 by multiplying the number of printed pages by this multiplier. According to the present embodiment, the multiplier is set to a larger value for types of ink expected to produce high quality than for other types of ink, thereby providing users with an incentive to improve printing quality.

Another feature of the present embodiment is that the advertisement provision server 100 sets a multiplier in S240 or S250 according to the number of genuine cartridges 285 and determines the number of points to be granted in S36 of FIG. 2 by multiplying the number of printed pages by this multiplier. According to the present embodiment, the multiplier is set to a larger value when all cartridges 285 mounted in the cartridge holder 280 of the printer 200 are genuine products than when the mounted cartridges 285 includes other types. As a result, the user can be provided with an incentive to improve printing quality by using genuine products as much as possible.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below, wherein like parts and components to those in the above embodiment are designated with the same reference numerals to avoid duplicating description:

(1) Setting a Granting Rate of Points According to the Consumption Amounts of Consumables In the above embodiment, the advertisement provision server 100 sets a multiplier by which the number of base points is to be multiplied based solely on the type of cartridges 285, but the advertisement provision server 100 may determine a multiplier according to the consumption amounts of consumables. A variation of this type will be described with reference to FIGS. 6, 7, 8, 9A, 9B and 9C.

Figure 6:
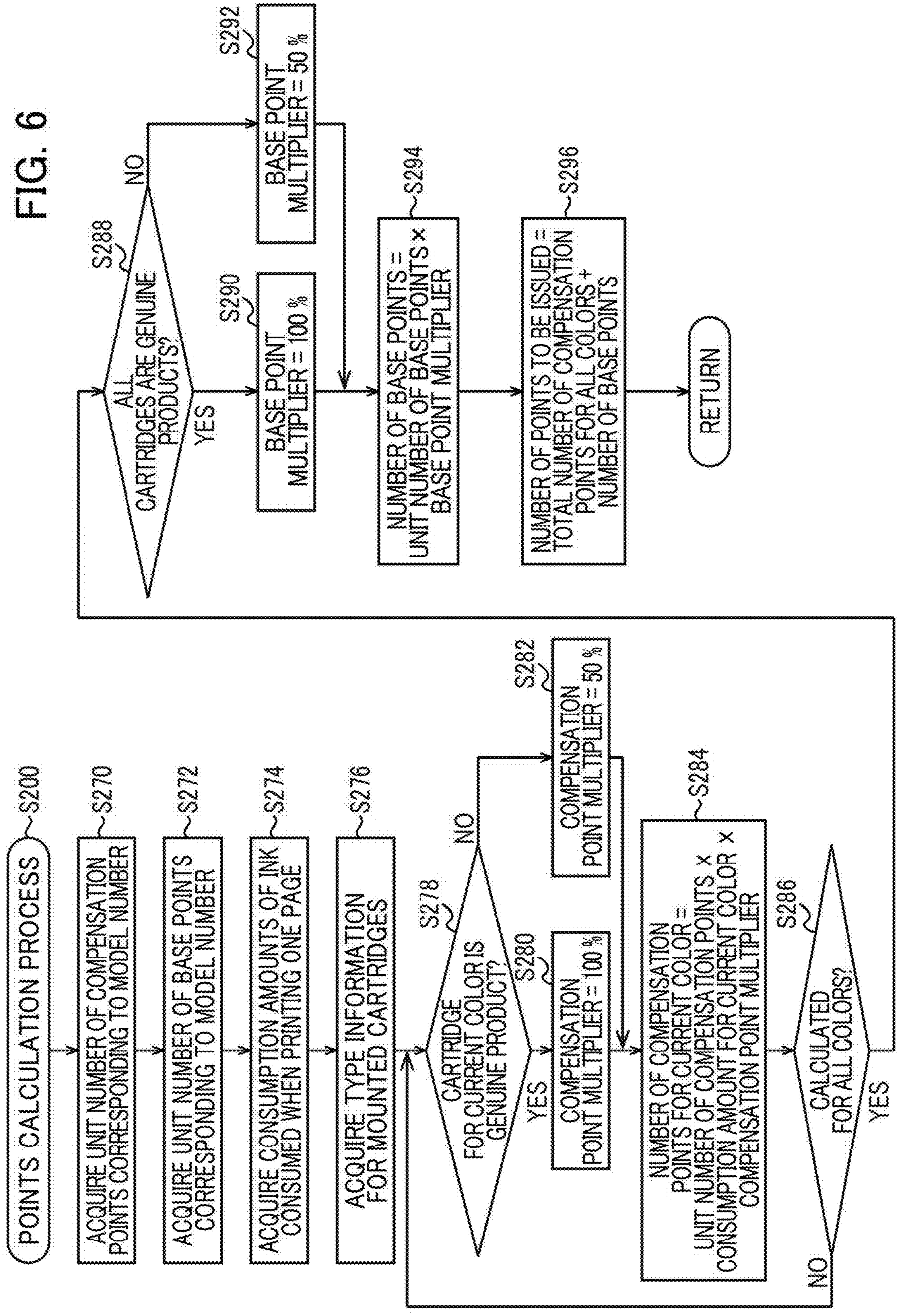
FIG. 6 is a flowchart illustrating another example of steps in the points calculation process executed by the control unit of the advertisement provision server.

FIG. 6 is a flowchart illustrating steps in a points calculation process according to a variation of the embodiment. The control unit 110 of the advertisement provision server 100 executes this points calculation process in S200 of FIG. 2 described above.

In this variation, the points corresponding to points information associated with user account information or a printer ID are set to the sum of compensation points and base points. The number of the compensation points is calculated according to the consumed amounts of consumables, and the number of base points is calculated according to the type of cartridges 285. In S270 at the beginning of FIG. 6, the control unit 110 acquires a unit number of compensation points corresponding to the model number of the printer 200, which is indicated by the model number information acquired in S22 of FIG. 2 described above. The unit number of compensation points is set as the cost of ink per picoliter consumed when printing one A4-size sheet of printing paper in color at standard print settings on the printer 200, for example. Compensation points, as with base points in the above embodiment, include points that compensate for the cost of ink consumed by the printer 200 when performing advertisement printing, and points given as a reward for advertisement printing. In the example illustrated in FIG. 7, a printer 200 with model number "P-AAA" has a unit number of compensation points set at 1.0 points per picoliter (pt/pl) for black ink and a unit number of compensation points set at 2.0 [pt/pl] for color inks other than black. Similarly, a printer 200 with model number "P-BBB" has a unit number of compensation points set at 0.5 [pt/pl] for black ink and a unit number of compensation points set at 1.0 [pt/pl] for color inks other than black. A printer 200 with model number "P-CCC" has a unit number of compensation points set at 0.3 [pt/pl] for black ink and a unit number of compensation points set at 0.6 [pt/pl] for color inks other than black. As in the embodiment described above, users can utilize points with the equivalency of 1 point=1 yen in this variation.

In S272 of FIG. 6, the control unit 110 acquires a unit number of base points corresponding to the model number of the printer 200, which is indicated by the model number information acquired in S22 of FIG. 2 described above. The unit number of base points is set based on the cost of ink for printing one A4-size sheet of printing paper in color at standard print settings on the printer 200, for example. In the example illustrated in FIG. 8, a printer 200 with model number "P-AAA" has a unit number of base points set at 10 points (pt) which corresponds to the cost of ink for printing one A4-size page. Similarly, a printer 200 with model number "P-BBB" has a unit number of base points set at 5 [pt] which corresponds to the cost of ink for printing one A4-size page. A printer 200 with model number "P-CCC" has a unit number of base points set at 3 [pt] which corresponds to the cost of ink for printing one A4-size page.

In S274 of FIG. 6, the control unit 110 acquires the consumption amounts of ink consumed when printing the most recent page. The consumption amounts of ink are received from the printer 200 in S32 together with the one-page completion notification. These consumption amounts of ink are based on detection results by the ink level sensors (not illustrated) provided in the printer 200 for detecting the residual amount or consumption amount of ink in each cartridge 285, as described above. Alternatively, the consumption amounts of ink may be detected through a method of counting the number of times ink droplets have been ejected from the recording head. The consumption amount of ink is an example of the consumption amount of the consumable of the present disclosure, and the process executed by the advertisement provision server 100 in S274 is an example of the amount acquisition process of the present disclosure.

As in S220 of FIG. 4 described above, in S276 of this variation the control unit 110 acquires type information on the cartridges 285 mounted in the cartridge holder 280 of the printer 200 based on detection results from the reader-writers 290. As in the embodiment, when cartridges 285 of a plurality of ink colors are mounted in the cartridge holder 280, the control unit 110 obtains a plurality of sets of type information for all cartridges 285. The type information is an example of the quality information related to a printing quality of the printed matter of the present disclosure, and in the present variation the process performed by the control unit 110 of the advertisement provision server 100 in S276 is an example of the information acquisition process of the present disclosure.

As described above in S230, in S278 the control unit 110 determines whether the cartridge 285 mounted in the cartridge holder 280 for a certain color is a genuine product according to the type information acquired in S220. In the present variation, the ink accommodated in the genuine cartridge 285 is an example of the specific-type consumable of the present disclosure. When the corresponding cartridge 285 is a genuine product (S278: YES), in S280 the control unit 110 sets the compensation point multiplier by which the unit number of compensation points is to be multiplied to 100%. When the cartridge 285 is a non-genuine product (S278: NO), in S282 the control unit 110 sets the compensation point multiplier by which the unit number of compensation points is to be multiplied to 50%. One of these compensation point multipliers is stored in association with type information indicating each type of cartridge 285 in the storage unit 115 of the advertisement provision server 100 in advance. In the present variation, the compensation point multipliers described above are an example of the granting rate of the present disclosure.

After setting the compensation point multiplier in S280 or S282, in S284 the control unit 110 calculates the number of compensation points for ink of the current color on the current page. Specifically, the control unit 110 multiplies the unit number of compensation points by the consumption amount of ink for the current color and multiplies the result by the compensation point multiplier.

In S286 the control unit 110 determines whether the numbers of compensation points have been calculated for all cartridges 285 mounted in the cartridge holder 280. When there remain any ink colors for which the numbers of compensation points have not been calculated (S286: NO), the control unit 110 repeats the above process in S278 through S284. Once the numbers of compensation points have been calculated for all colors (S286: YES), the control unit 110 advances to S288 described later.

FIG. 9A illustrates a sample calculation of the number of compensation points for the printer 200 with model number "P-AAA" shown in FIG. 7. In this example, ink consumption amount is 16 [pl] for black ink, 10 picoliters (pl) for cyan ink, 12 [pl] for magenta ink, and 14 [pl] for yellow ink. Since a printer 200 with model number "P-AAA" has a unit number of compensation points set at 1.0 [pt/pl] for black ink and unit numbers of compensation points set at 2.0 [pt/pl] for color inks as described above, the number of compensation points to be granted when the cartridges 285 are genuine are 1.0×16=16 [pt] for black ink, 2.0×10=20 [pt] for cyan ink, 2.0×12=24 [pt] for magenta ink, and 2.0×14=28 [pt] for yellow ink. Similarly, the number of compensation points to be awarded for non-genuine cartridges 285 are 1.0×16×0.5=8 [pt] for black ink, 2.0×10×0.5=10 [pt] for cyan ink, 2.0×12×0.5=12 [pt] for magenta ink, and 2.0×14× 0.5=14 [pt] for yellow ink.

As described above, when the black, cyan, magenta, and yellow cartridges 285 are all genuine products, for example, the number of compensation points for each color would be 16 [pt] for black ink, 20 [pt] for cyan ink, 24 [pt] for magenta ink, and 28 [pt] for yellow ink, bringing the total to 88 [pt]. On the other hand, when the black, cyan, magenta, and yellow cartridges 285 are all non-genuine products, the number of compensation points for each color would be 8 [pt] for black ink, 10 [pt] for cyan ink, 12 [pt] for magenta ink, and 14 [pt] for yellow ink, bringing the total to 44 [pt]. As another example, when the cartridges 285 for black, magenta, and yellow are genuine products and only the cartridge 285 for cyan is a non-genuine product, the number of compensation points for each color would be 16 [pt] for black ink, 10 [pt] for cyan ink, 24 [pt] for magenta ink, and 28 [pt] for yellow ink, bringing the total to 78 [pt].

Returning to FIG. 6, in S288, as in S230 described above, the control unit 110 determines whether all cartridges 285 mounted in the cartridge holder 280 are genuine products on the basis of the type information acquired in S220 described above. When all cartridges 285 are genuine products (S288: YES), in S290 the control unit 110 sets the base point multiplier by which the unit number of base points is to be multiplied to 100%. However, when even one of the cartridges 285 is non-genuine (S288: NO), in S292 the control unit 110 sets the base point multiplier by which the unit number of base points is to be multiplied to 50%. One of these base point multipliers is associated with each type of cartridge 285, and these associations are stored in the storage unit 115 of the advertisement provision server 100 in advance. These multipliers are also an example of the granting rate of the present disclosure.

After setting the base point multiplier in S290 or S292, in S294 the control unit 110 calculates the number of base points for the current page by multiplying the unit number of base points by the base point multiplier.

FIG. 9B illustrates a sample calculation of the number of base points for the printer 200 with model number "P-AAA" shown in FIG. 8. Since a printer 200 with model number "P-AAA" has a unit number of base points set at 10 [pt] in this example, the number of base points for one page would be 10×1.0=10 [pt] when all black, cyan, magenta, and yellow cartridges 285 are genuine products. On the other hand, when any one of the black, cyan, magenta, and yellow cartridges 285 is a non-genuine product, the number of base points for one page would be 10×0.5=5 [pt].

In S296 of FIG. 6, the control unit 110 sets the number of points to be issued per page to the sum of the total number of compensation points for cartridges 285 of all colors calculated by repeating the process in S278 through S286, and the number of base points calculated in S294. Subsequently, the control unit 110 ends the process in FIG. 6.

FIG. 9C illustrates examples for a printer 200 with model number "P-AAA". When the black, cyan, magenta, and yellow cartridges 285 are all genuine products, the control unit 110 sets the total number of points to be issued to 98 [pt] by adding 88 compensation points for all colors to 10 base points. When the black, cyan, magenta, and yellow cartridges 285 are all non-genuine products, the control unit 110 sets the total number of points to be issued to 49 [pt] by adding 44 compensation points for all colors to 5 base points. When the black, magenta, and yellow cartridges 285 are genuine products but the cyan cartridge 285 is a non-genuine product, the control unit 110 sets the total number of points to be issued to 83 [pt] by adding 78 compensation points for all colors to 5 base points.

All processes in this variation other than the points calculation process of S200 are the same as those described in the above embodiment with reference to FIGS. 2, 3, and the like and, hence, a description of those processes will not be repeated here.

In this variation, the number of points is determined by multiplying the compensation point multiplier set for each type of cartridge 285 by the consumption amount of ink acquired in S274. For example, setting the compensation point multiplier higher for types of ink expected to produce higher quality (for genuine cartridges 285 in the above example) than the compensation point multiplier for all other types provides the user an incentive to improve printing quality.

(2) Setting a Granting Rate of Points According to Print Settings

In the above embodiment, the multiplier is determined according to the type of cartridges 285, but the present disclosure is not limited to this configuration and the multiplier may be set according to print settings for the printer 200 instead. Such a variation will be described below with reference to FIG. 10, which corresponds to FIG. 4 of the embodiment.

Figure 10:
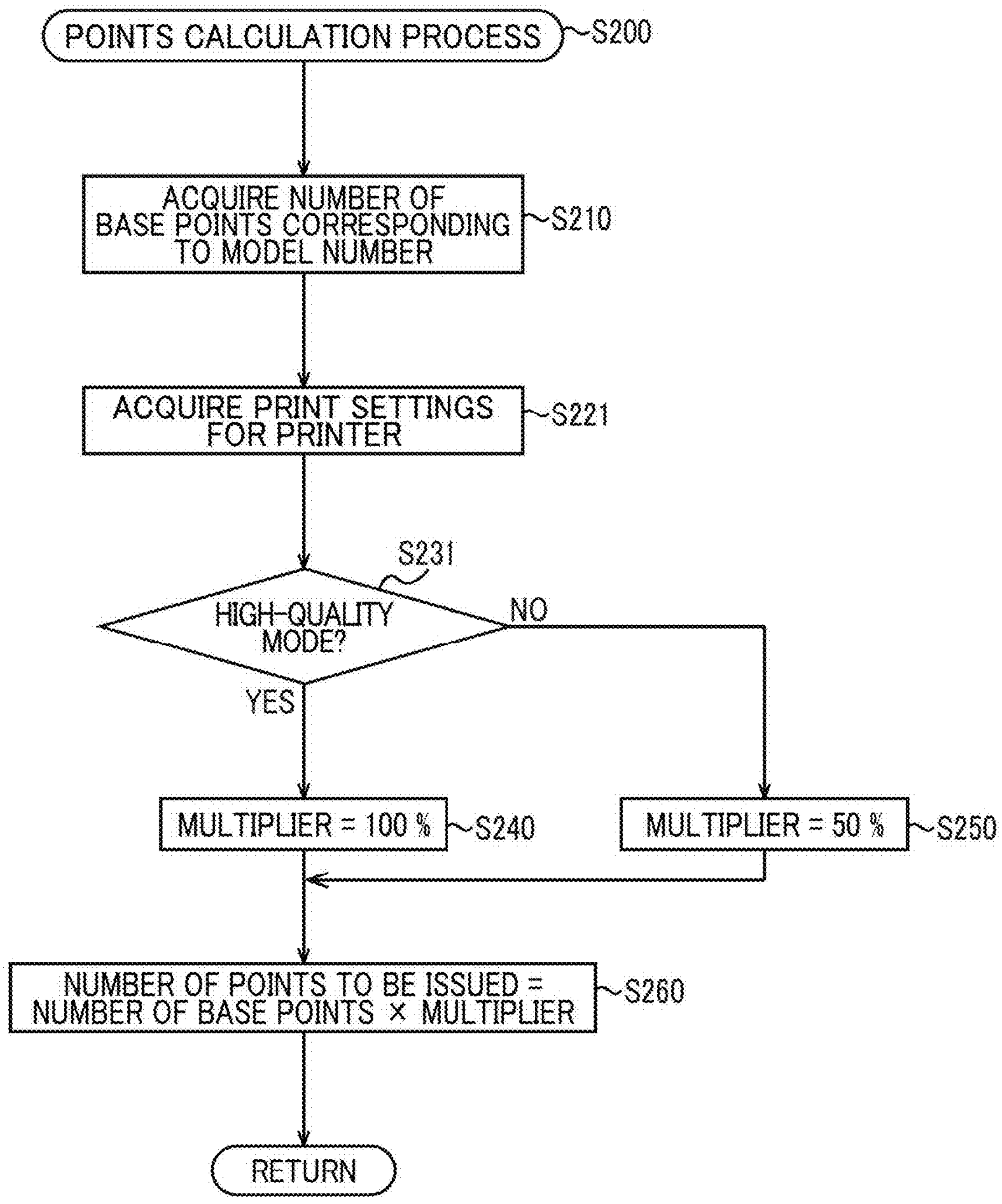
FIG. 10 is a flowchart illustrating another example of steps in the points calculation process executed by the control unit of the advertisement provision server.

FIG. 10 is a flowchart illustrating steps in the points calculation process of S200 according to this variation of the embodiment. The control unit 110 of the advertisement provision server 100 executes this points calculation process in S200 of FIG. 2 described above. In FIG. 10, the control unit 110 first executes the same process of S210 described in FIG. 4. However, step S221 of FIG. 10 is executed after S210 in this variation in place of S220 of FIG. 4. In S221 the control unit 110 acquires print settings for the printer 200, such as print operation modes provided by the printer 200. In this example, a high-quality mode and a normal mode are set in accordance with high and low printing resolution capabilities of a printing engine in the printing unit 270. The print settings are an example of the quality information related to a printing quality of the printed matter of the present disclosure, and the image quality of high printing resolution in the high-quality mode and the image quality of low printing resolution in the normal mode are examples of the printing quality of the present disclosure. Furthermore, the process executed by the control unit 110 of the advertisement provision server 100 in S221 is an example of the information acquisition process of the present disclosure. The control unit 110 of the advertisement provision server 100 may acquire the print settings from the printer 200 or from the terminal device 300. Alternatively, when the advertisement management server 500 stores print settings corresponding to each set of delivery information, the control unit 110 of the advertisement provision server 100 may acquire these print settings from the advertisement management server 500.

Next, the control unit 110 performs a determination in S231 in place of S230 described in the embodiment to determine whether the print operation mode is the high-quality mode on the basis of the print settings acquired in S221. When the high-quality mode is set (S231: YES), the control unit 110 performs the process in S240 described in the embodiment to set the multiplier by which the number of base points is to be multiplied to 100%. When the print operation mode is not the high-quality mode, i.e., when the print operation mode is the normal mode in this example (S231: NO), the control unit 110 performs the process in S250 described above to set the multiplier by which the number of base points is to be multiplied to 50%. As in the embodiment, one of these multipliers is associated with each print operation mode, and these associations are stored in the storage unit 115 of the advertisement provision server 100 in advance. The multiplier described above is an example of the granting rate of the present disclosure.

After setting the multiplier in S240 or S250, in S260 the control unit 110 calculates the number of points to be issued for the current page. As in the above embodiment, the control unit 110 calculates the number of points by multiplying the number of base points acquired in S210 by the multiplier set in S240 or S250. Subsequently, the control unit 110 ends the process of FIG. 10.

All processes other than the points calculation process in this variation are identical to those described in the embodiment with reference to FIGS. 2, 3, and the like, and a description of these processes will not be repeated here.

In this variation, printing quality is higher when the print operation mode is set to the high-quality mode in the print settings for the printer 200 than when the print operation mode is set to the normal mode. Therefore, points are granted in this variation according to the print settings for the printer 200. The number of points granted is greater when the print settings indicate the high-quality mode for which a high quality can be expected than when the print settings indicate another mode. More specifically, the advertisement provision server 100 sets the number of points in S36 of FIG. 2 by multiplying the number of printed pages by the multiplier, which in this variation is variably set in S240 or S250 according to the printing quality. This method can provide the user with an incentive to improve printing quality. This is particularly effective when the visual impact of the printing quality is considerable, such as when the delivery information depicts images of fresh food.

Figure 11:
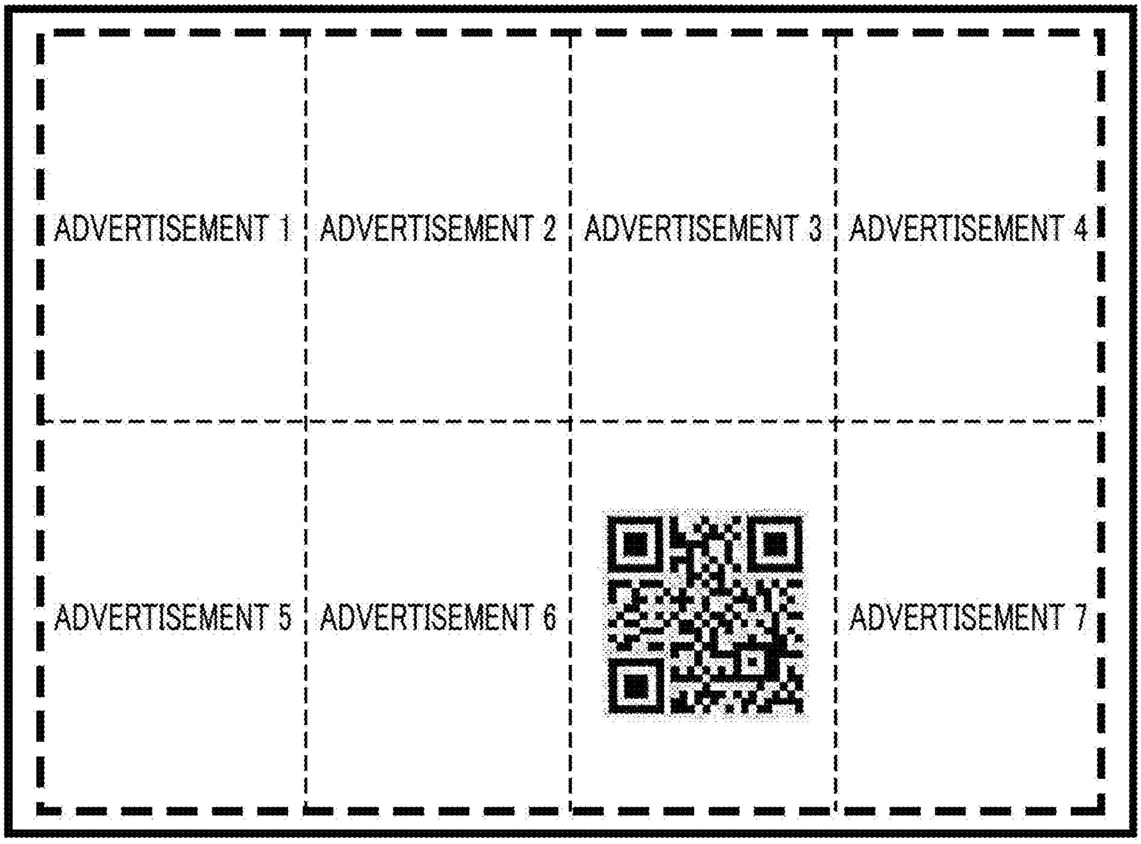
FIG. 11 is a schematic diagram illustrating the appearance of a printed advertisement containing a two-dimensional code.

(3) Determining Whether to Grant Points According to the Result of Reading a Two-Dimensional Code in a Printed Advertisement FIG. 11 illustrates an example in which a layout for a delivery image to be printed by the printer 200 includes a plurality of advertisement placement frames. A two-dimensional code is printed in one of the advertisement placement frames. When the two-dimensional code is read correctly, points are granted under the assumption that the advertisement has been printed properly. This variation will be described next with reference to FIGS. 12 and 13, which correspond to FIGS. 2 and 3 in the above embodiment.

Figure 12:
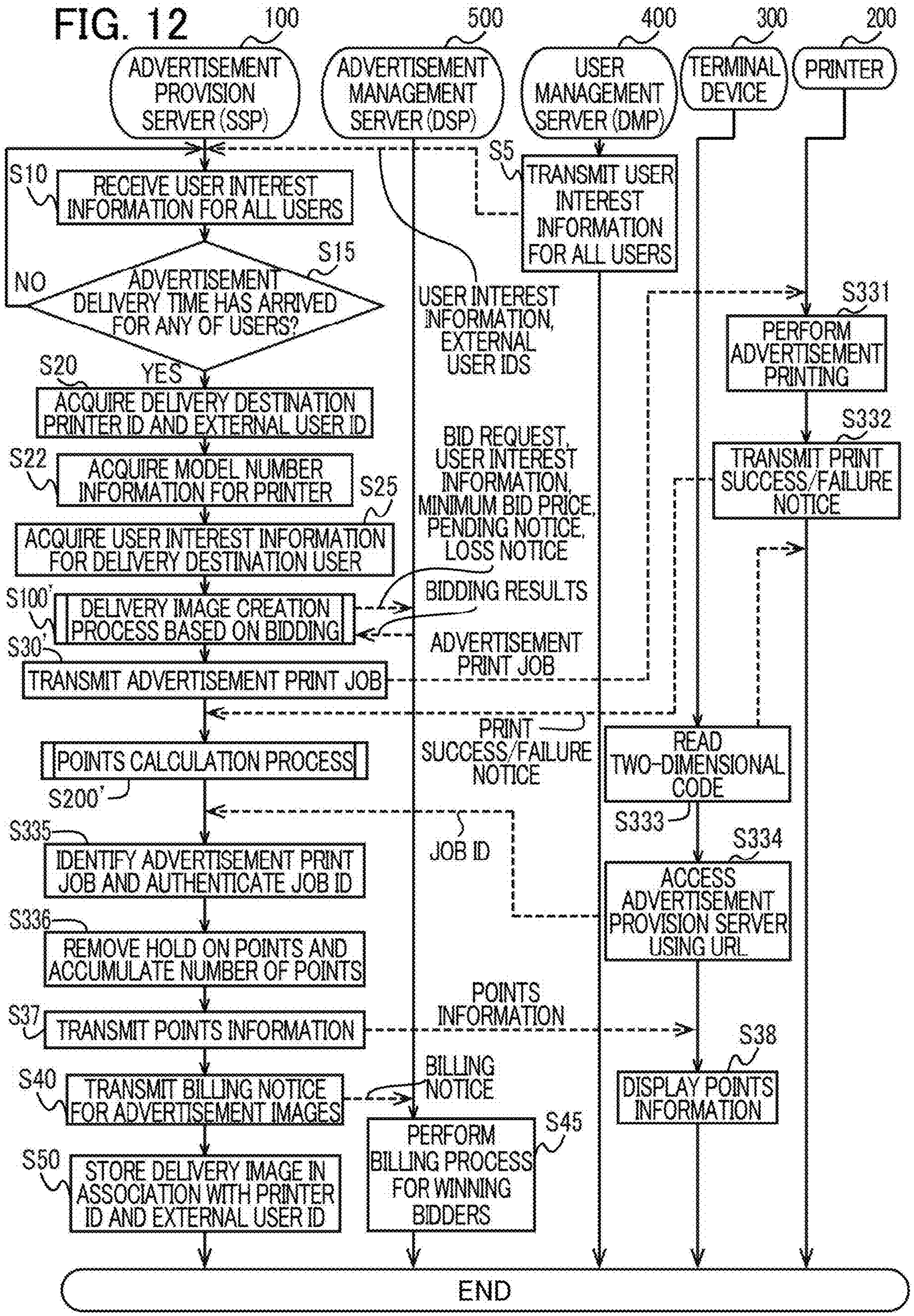
FIG. 12 is a sequence chart illustrating another example of steps in the process executed by the advertisement provision server, the advertisement management server, the user management server, the terminal device, and the printer in cooperation with each other.

FIG. 12 is a sequence chart illustrating steps in a control sequence according to a variation of the embodiment that is executed through cooperation among the advertisement provision server 100, advertisement management server 500, user management server 400, and printer 200. After executing the same steps S5 through S25 described in FIG. 2 of the embodiment, the advertisement provision server 100 executes step S100' in FIG. 12 in place of S100 of FIG. 2. As in S100 described above, the advertisement provision server 100 performs a delivery image creation process in S100' in cooperation with the advertisement management server 500 for creating a delivery image to be printed by the printer 200 based on advertisement images submitted along with bids from advertisers.

Figure 13:
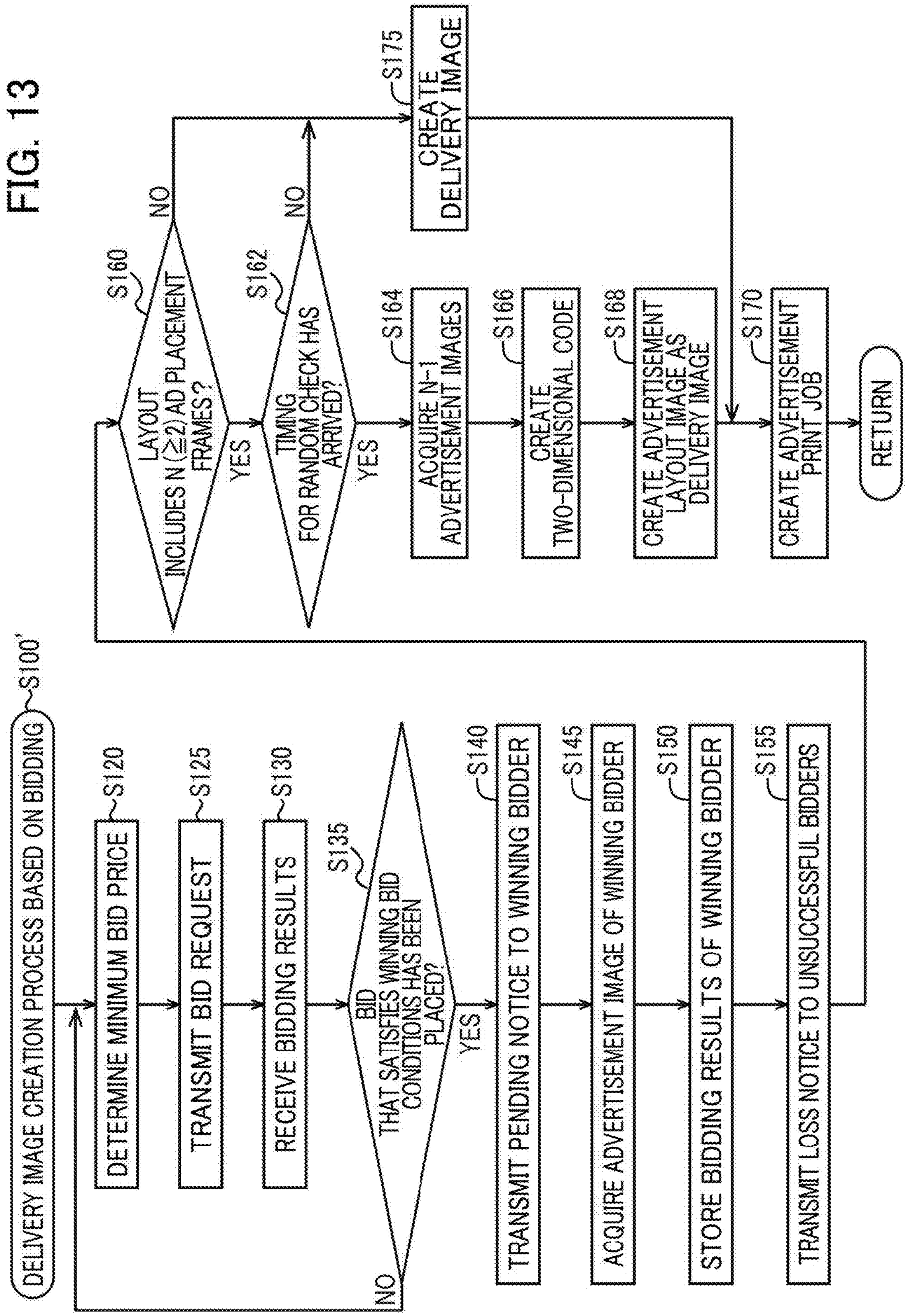
FIG. 13 is a flowchart illustrating another example of steps in the delivery image creation process executed by the control unit of the advertisement provision server.

FIG. 13 illustrates the control process executed by the control unit 110 of the advertisement provision server 100 in the delivery image creation process of S100'. Following the same steps S120 through S155 in FIG. 3 of the embodiment, FIG. 13 has steps S160 through S170 in addition to step S175 in FIG. 3.

That is, in S160 the control unit 110 determines whether the layout for a delivery image to be printed by the printer includes N advertisement placement frames (where N is an integer equal to or grater than two). When the layout includes only one advertisement placement frame (S160: NO), the control unit 110 advances to S175. In S175 the control unit 110 creates a delivery image based on an advertisement image acquired in S145 as in the same process of FIG. 3, and subsequently advances to S170 described later. However, when the layout includes two or more advertisement placement frames (S160: YES), the control unit 110 advances to S162.

The two-dimensional code illustrated in FIG. 11 of this variation is not included every time an advertisement is printed but is included sporadically once every several prints to check the printing quality. In S162 the control unit 110 determines whether such a random check is to be performed. Specifically, a known method using random numbers may be employed to set timings at which the above checks are performed to about once every ten prints. In S162 the control unit 110 determines whether the timing for a random check has arrived. When a timing has not arrived (S162: NO), the control unit 110 advances to S175. In S175 the control unit 110 arranges N advertisement images acquired in S145 in N advertisement placement frames to create a delivery image, and subsequently advances to S170 described later. When a timing has arrived (S162: YES), the control unit 110 advances to S164.

Since one of the N advertisement placement frames described above must be used for the two-dimensional code in this case, in S164 the control unit 110 acquires, from among advertisement images acquired in S145, N−1 advertisement images to be arranged in the remaining N−1 advertisement placement frames.

In S166 the control unit 110 creates a two-dimensional code for use in the random check according to a known method. The control unit 110 issues a job ID and encodes the job ID and a URL for accessing a prescribed web page of the advertisement provision server 100. The control unit 110 includes this encoded information in the two-dimensional code. The job ID is identification information for identifying an advertisement print job to be created in S170 described below. The advertisement provision server 100 stores the job ID in the storage unit 115. In S168 the control unit 110 arranges an image of the two-dimensional code created in S166 in one of the advertisement placement frames and arranges the N−1 advertisement images acquired in S164 in the remaining N−1 advertisement placement frames to create an advertisement layout image including the two-dimensional code as a delivery image. The control unit 110 then advances to S170.

In S170 the control unit 110 creates an advertisement print job that includes the delivery image created in S168 or S175. Subsequently, the control unit 110 ends the process in FIG. 13.

In S30' of FIG. 12, which replaces S30 of FIG. 2, the advertisement provision server 100 delivers the advertisement print job created in S170 to the printer 200. In the present variation, the process executed in S30' is an example of the delivery process of the present disclosure. As described above, the advertisement provision server 100 may also deliver the advertisement print job to the printer 200 via a relay device in S30'. Alternatively, rather than delivering an advertisement print job to the printer 200, the advertisement provision server 100 may transmit a page description language description required for printing the delivery image included in the advertisement print job or a ling to the delivery image to the printer 200.

When the printer 200 receives an advertisement print job sent in S30', in S331 the printer 200 begins advertisement printing corresponding to the delivery image included in the received advertisement print job. After the advertisement printing is completed, in S332 the printer 200 transmits a print success notice to the advertisement provision server 100. When printing failed, in S332 the printer 200 transmits a print failure notice to the advertisement provision server 100 instead.

At this time, the advertisement provision server 100 executes a points calculation process in S200', which replaces S200 of FIG. 2. The control process executed by the control unit 110 of the advertisement provision server 100 in the points calculation process of S200' will be described next with reference to the flowchart in FIG. 14, which corresponds to the process of FIG. 4.

Figure 14:
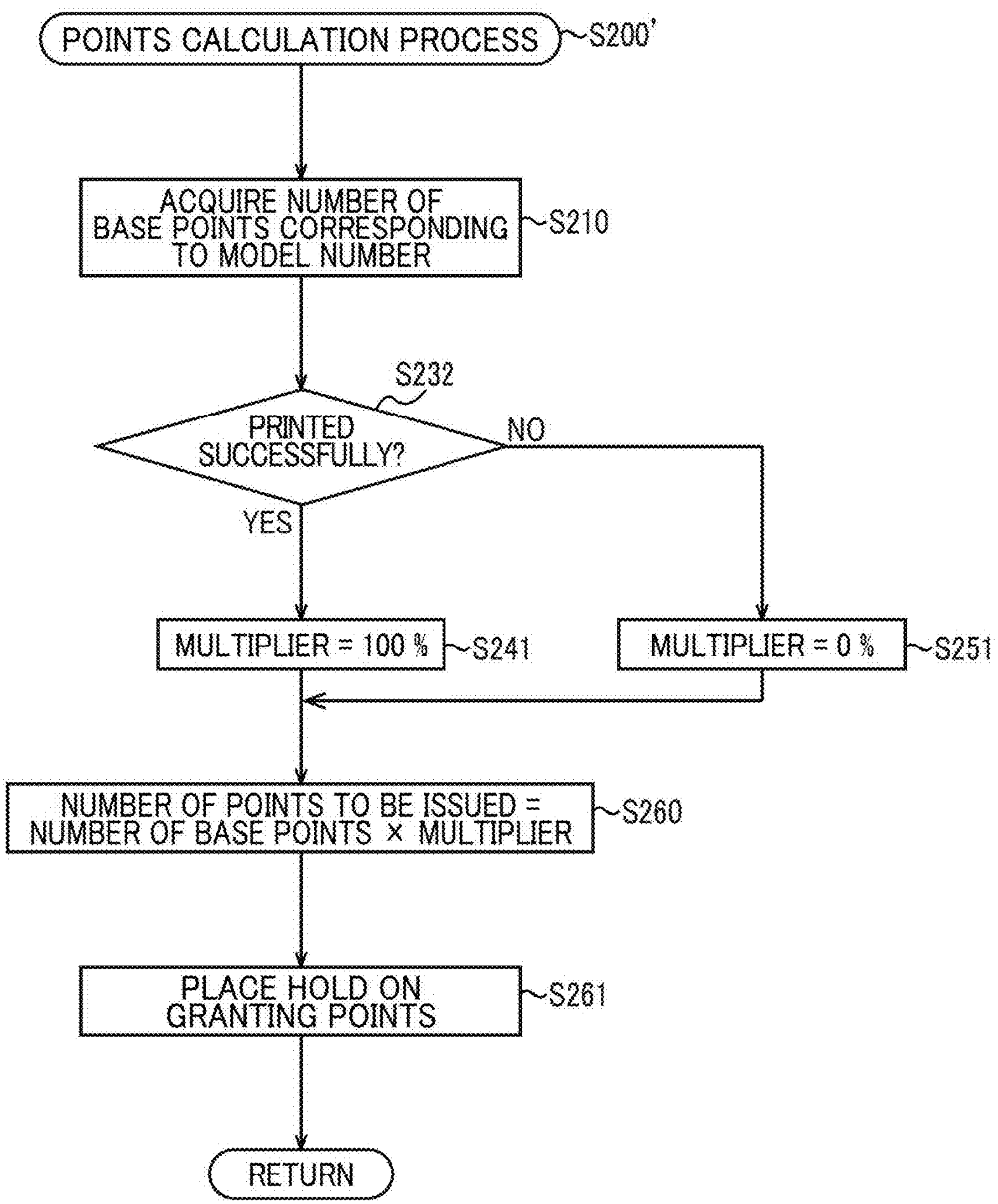
FIG. 14 is a flowchart illustrating another example of steps in the points calculation process executed by the control unit of the advertisement provision server.

As illustrated in FIG. 14, after performing the same step S210 described in FIG. 4, in S232 the control unit 110 determines whether the advertisement printing has been completed successfully on the basis of the notice transmitted from the printer 200 in S332. When a print success notice transmitted from the printer 200 in S332 has been received by the advertisement provision server 100 (S232: YES), in S241 the control unit 110 sets the multiplier by which the number of base points is to be multiplied when calculating the number of points to 100%. However, when a print failure notice transmitted from the printer 200 in S332 has been received by the advertisement provision server 100 (S232: NO), in S251 the control unit 110 sets the multiplier by which the number of base points is to be multiplied to 0%. Thus, steps S241 and S251 in effect switch whether or not points are granted on the basis of whether advertisement printing has been successful. These multipliers are stored in the storage unit 115 of the advertisement provision server 100 in advance, for example.

After setting the multiplier in S241 or S251, in S260 the control unit 110 calculates the number of points to be issued for the advertisement print job described above by multiplying the number of base points by the multiplier, as in the same process of FIG. 4. In this variation, a new step is added after S260. That is, in S261 the control unit 110 of the advertisement provision server 100 places a temporary hold on granting the points calculated in S260, and subsequently ends the process in FIG. 14.

In this variation, the temporary hold placed on points calculated in the points calculation process in FIG. 14 has a prescribed time limit. Although not illustrated, if the hold is not removed within this prescribed time limit, the points will not be granted and will be invalidated.

In S333 of FIG. 12, the user performs operations to read the two-dimensional code contained in the delivery image that has been printed as described above using the camera provided in the terminal device 300. Here, a message such as "To authenticate, please scan the two-dimensional code. Points will not be granted until authenticated." is printed in the delivery image illustrated in FIG. 11, for example, or a similar message is displayed on the display unit 301 of the terminal device 300 when the above print success notice is transmitted. This message gives the user an incentive to perform operations to scan (read) the two-dimensional code.

The two-dimensional code contains the prescribed URL that has been encoded as described above. In S334 the terminal device 300 accesses the advertisement provision server 100 using the URL read from the two-dimensional code. The two-dimensional code also includes the encoded job ID described above. After reading this information, the terminal device 300 transmits information specifying the reading results (reading results information), including the job ID, to the advertisement provision server 100. The job ID is an example of the print identification information of the present disclosure. The reading results information is an example of the read code information of the present disclosure, and in the present variation, the reading results information is an example of the quality information of the present disclosure. Furthermore, the process in which the control unit 110 of the advertisement provision server 100 receives the reading results information is an example of the information acquisition process of the present disclosure.

In S335 the advertisement provision server 100 uses the job ID included in the reading results information received in S334 to identify the corresponding advertisement print job. Specifically, the advertisement provision server 100 stores the job ID attached to the advertisement print job when transmitting the advertisement print job for the delivery image including the two-dimensional code to the printer 200 in S30' and authenticates the job ID included in the reading results information received from the terminal device 300 in S334 by comparing this job ID to the stored job ID. In this way, the advertisement provision server 100 determines whether the two-dimensional code has been correctly read by the terminal device 300 on the basis of the reading results information received from the terminal device 300. The process executed by the advertisement provision server 100 in S335 is an example of the authentication process of the present disclosure.

When the advertisement provision server 100 determines in the authentication process of the job ID of S335 that the two-dimensional code read by the terminal device 300 matches the two-dimensional code in the advertisement print job transmitted in S30' (current advertisement print job), in S336 the advertisement provision server 100 removes the hold which has been placed on the points for the current advertisement print job in S261, granting the user or the printer 200 the points calculated in S260. The advertisement provision server 100 also removes holds on points previously calculated for advertisement print jobs without two-dimensional codes that have been executed before the authentication process of the job ID for the current advertisement print job in S335. Specifically, when one or more advertisement print jobs for delivery images not including two-dimensional codes have been transmitted to and executed on the printer 200 before the current authentication of the job ID in S335 and after the previous authentication of another job ID in S335 and removal of holds on points for this job ID, the advertisement provision server 100, upon receipt of a print success/failure notice, performs a points calculation process of S200' to calculate the number of points for the corresponding advertisement print job in S260 and to place a hold on the points in S261. For these advertisement print jobs, in S336 of FIG. 12, the advertisement provision server 100 also removes holds placed on these points, accumulates the number of points, and grants the user or the printer 200 the accumulated points. In S37 the advertisement provision server 100 transmits points information indicating the number of points accumulated and granted in S336 to the terminal device 300. In the present variation, the process executed by the control unit 110 of the advertisement provision server 100 in S200', S336 and S37 is an example of the granting process of the present disclosure.

On the other hand, when the advertisement provision server 100 determines in the authentication process of S335 that the two-dimensional code read by the terminal device 300 does not match the code in the advertisement print job transmitted in S30', the advertisement provision server 100 cancels the hold placed on the points in S261 but ends the process without granting points calculated in S260 to the user or the printer 200.

The steps of FIG. 12 following S37 are identical to those in FIG. 2 and will not be described here.

In the present variation, the advertisement provision server 100 creates a two-dimensional code and transmits a delivery image including advertisement images and the created two-dimensional code to the printer 200, and the printer 200 prints the delivery image including the two-dimensional code. In S334 the terminal device 300 acquires reading results information representing the results of reading the printed two-dimensional code. The advertisement provision server 100 grants points in S37 depending on the acquired reading results information. According to the present variation, points are granted when the two-dimensional code is adequately read by the scanner function of the terminal device 300 and not granted in all other cases, thereby providing the user an incentive to improve the printing quality.

One feature of the present variation is that the advertisement provision server 100 includes a job ID in the two-dimensional code delivered to the printer 200 as print identification information and performs authentication by comparing this job ID against the job ID included in the reading results information acquired in S334. Since points are granted according to the authentication results, the advertisement provision server 100 can avoid granting points when authentication is unsuccessful. This variation can suppress the unauthorized acquisition of points by a user scanning a two-dimensional code printed by another printer with the terminal device 300 and pretending the results were printed by the printer 200.

Here, a printer ID may be used as the print identification information in place of the job ID described above. In this case, the advertisement provision server 100 performs authentication using reading results of a two-dimensional code to determine whether to grant points for an entire month, for example.

(4) Determining Whether to Grant Points According to the Result of Scanning a Printed Advertisement In this variation, an advertisement printed by the printer 200 is scanned using a scanner provided with the printer 200 or a camera provided in a terminal device 300, for example. The scanner or camera is an example of the scanner of the present disclosure. Printing quality information based on the results of scanning this image is transmitted to the advertisement provision server 100 as the quality information. The advertisement provision server 100 acquires the printing quality information, calculates the number of points based on this printing quality information and grants the points to a user of the printer 200 or the printer 200. The advertisement provision server 100 may acquire scanning results from the printer 200 or the terminal device 300 as the printing quality information and perform image quality analysis. Alternatively, the printer 200 or terminal device 300 that scanned the image may perform image analysis itself and transmit the results of this analysis to the advertisement provision server 100 as the printing quality information.

According to the present variation, the advertisement provision server 100 checks printing quality by comparing the printing quality information based on the scanning results with the original delivery image transmitted to the printer 200 for printing, for example. The advertisement provision server 100 then grants more points when the scanning results by the scanner (e.g., the scanner provided with the printer 200 or the camera provided in the terminal device 300) are of sufficiently high quality than when not of sufficiently high quality, thereby providing the user with an incentive to improve printing quality.

(5) Other Variations

While the advertisement provision server 100 is described above as a standalone device, a plurality of devices may operate in conjunction with each other to implement the functions of the advertisement provision server 100.

The advertisement provision server 100 described above acquires an advertisement image that satisfies predetermined conditions, such as a condition that an advertisement image is suited to the user's behavioral information or interest information, through a bidding process, but the method of acquiring the advertisement image is not limited to this. The advertisement provision server 100 may acquire an advertisement image that satisfies these predetermined conditions through other suitable methods. Other methods may include acquiring an advertisement image that is suited to user information including the gender, age, place of residence, occupation, place of work, annual income, and family structure of the user using the external service, for example.

In the above description, advertisement information (advertisement images) is used as an example of the information managed by the advertisement management server 500 and delivered to the advertisement provision server 100, but the information being managed and delivered may be other service content. Examples of such service content may be manga, images from novels, movies, thumbnail images from movies, and the like.

In the above description, points granted as a reward to the user of the printer 200 or the printer 200 are associated with a user account or printer ID, but the present disclosure is not limited to this method. For example, when the user has entered an agreement for printing with the printer 200, whereby the user is billed for a number of printable sheets and the printer 200 is configured to print up to that number of printable sheets, this number of printable sheets may be associated with the user account or the printer ID as a reward.

The sequence charts and flowcharts illustrated in FIGS. 2, 3, 4, 6, 10, 12, 13 and 14 in the above description do not limit the present disclosure to the steps indicated therein. Steps may be added or deleted, or their order may be rearranged, without departing from the spirit and technical ideas of the disclosure.

In addition to what has already been described, the methods according to the embodiment and its variations described above may be used in suitable combinations.

In addition, although not illustrated individually, the present disclosure may be implemented with various modifications without departing from the spirit of the disclosure.

What is claimed is:

1. A server comprising:
- a communication interface;
- a memory configured to store identification information identifying one of a printer and a user of the printer; and
- a controller configured to perform:
  - a delivery process transmitting delivery information to the printer via the communication interface, the printer being configured to perform printing based on the delivery information transmitted in the delivery process to output printed matter;
  - an information acquisition process acquiring quality information related to a printing quality of the printed matter; and
  - a granting process granting a reward to the one of the printer and the user of the printer identified by the identification information in accordance with the quality information acquired in the information acquisition process.

2. The server according to claim 1,
- wherein in the information acquisition process, the controller acquires, as the quality information, type information identifying a consumable type of a consumable mounted in the printer, and
- wherein in the granting process, the controller grants the reward in accordance with the type information acquired in the information acquisition process.

3. The server according to claim 2,
- wherein the memory is configured to store a plurality of granting rates in association with respective ones of a plurality of sets of type information, the plurality of sets of type information identifying respective ones of a plurality of consumable types,
- wherein the controller is configured to further perform:
  - an amount acquisition process acquiring a printing amount of the printed matter printed by the printer with a mounted consumable, and wherein in the granting process, the controller grants the reward obtained by multiplying the printing amount acquired in the amount acquisition process by a selected granting rate selected from among the plurality of granting rates, the selected granting rate corresponding to type information identifying a consumable type of the mounted consumable.

4. The server according to claim 2, wherein a plurality of consumables is mountable in the printer, wherein the memory is configured to store a plurality of granting rates, each of the plurality of granting rates corresponding to a number of specific-type consumables mounted in the printer, each of the specific-type consumables having a specific consumable type, wherein the controller is configured to further perform:

an amount acquisition process acquiring a printing amount of the printed matter printed by the printer with a plurality of mounted consumables, wherein in the information acquisition process, the controller acquires a plurality of sets of type information, each of the plurality of sets of type information identifying a consumable type of a respective one of the plurality of mounted consumables, and wherein in the granting process, the controller grants the reward obtained by multiplying the printing amount acquired in the amount acquisition process by a selected granting rate selected from among the plurality of granting rates, the selected granting rate being selected in accordance with the plurality of sets of type information acquired in the information acquisition process.

5. The server according to claim 2, wherein the memory is configured to store a plurality of granting rates in association with respective ones of a plurality of sets of type information, the plurality of sets of type information identifying respective ones of a plurality of consumable types, wherein the controller is configured to further perform:

an amount acquisition process acquiring a consumption amount of a mounted consumable consumed when the printing based on the delivery information is performed by the printer with the mounted consumable, and wherein in the granting process, the controller grants the reward obtained by multiplying the consumption amount acquired in the amount acquisition process by a selected granting rate selected from among the plurality of granting rates, the selected granting rate corresponding to type information identifying a consumable type of the mounted consumable.

6. The server according to claim 1, wherein in the information acquisition process, the controller acquires, as the quality information, a print setting which is set in the printer when the printing based on the delivery information is performed by the printer with a mounted consumable, and wherein in the granting process, the controller grants the reward in accordance with the print setting acquired in the information acquisition process.

7. The server according to claim 6, wherein the memory is configured to store a plurality of granting rates in association with respective ones of a plurality of printing quality levels, each of the plurality of printing quality levels being indicated by a respective one of a plurality of print settings set in the printer, wherein the controller is configured to further perform:

an amount acquisition process acquiring a printing amount of the printed matter printed by the printer, and wherein in the granting process, the controller grants the reward obtained by multiplying the printing amount acquired in the amount acquisition process by a selected granting rate selected from among the plurality of granting rates, the selected granting rate corresponding to a printing quality level indicated by the print setting acquired in the information acquisition process.

8. The server according to claim 1, wherein in the delivery process, the controller transmits, to the printer, prescribed code information along with the delivery information, the prescribed code information being related to a prescribed code image, the printer being configured to perform the printing based on the delivery information and the prescribed code information transmitted in the delivery process to output the printed matter containing a printed prescribed code image, wherein in the information acquisition process, the controller acquires, as the quality information, read code information corresponding to a reading result of the printed prescribed code image, and wherein in the granting process, the controller grants the reward in accordance with the read code information acquired in the information acquisition process.

9. The server according to claim 8, wherein in the delivery process, the prescribed code information includes print identification information identifying the printing performed by the printer, wherein the controller is configured to further perform:

an authentication process authenticating the read code information acquired in the information acquisition process using the print identification information to acquire an authentication result, and wherein in the granting process, the controller grants the reward in accordance with the authentication result acquired in the authentication process.

10. The server according to claim 1, wherein in the information acquisition process, the controller acquires, as the quality information, printing quality information based on a scanning result of the printed matter acquired by scanning the printed matter with a scanner, and wherein in the granting process, the controller grants the reward in accordance with the printing quality information acquired in the information acquisition process.

* * * * *